United States Patent
Matsuda

(10) Patent No.: US 10,138,819 B2
(45) Date of Patent: Nov. 27, 2018

(54) VEHICLE, STRADDLE-TYPE VEHICLE, AND METHOD OF DRIVING THROTTLE VALVE

(71) Applicant: Kawasaki Jukogyo Kabushiki Kaisha, Kobe-shi, Hyogo (JP)

(72) Inventor: Yoshimoto Matsuda, Kobe (JP)

(73) Assignee: KAWASAKI JUKOGYO KABUSHIKI KAISHA, Kobe-shi, Hyogo (JP)

(*) Notice: Subject to any disclaimer, the term of this patent is extended or adjusted under 35 U.S.C. 154(b) by 309 days.

(21) Appl. No.: 14/938,728

(22) Filed: Nov. 11, 2015

(65) Prior Publication Data

US 2016/0160763 A1  Jun. 9, 2016

(30) Foreign Application Priority Data

Dec. 9, 2014 (JP) .................................. 2014-248991
Dec. 9, 2014 (JP) .................................. 2014-248992

(51) Int. Cl.
*F02D 9/08* (2006.01)
*B62K 11/00* (2006.01)
(Continued)

(52) U.S. Cl.
CPC ............... *F02D 9/08* (2013.01); *B62K 11/00* (2013.01); *B62K 11/04* (2013.01); *F02D 9/1095* (2013.01);
(Continued)

(58) Field of Classification Search
CPC . B60W 2710/0661; B60W 2510/0609; B60W 2510/0604; F02D 41/0002;
(Continued)

(56) References Cited

U.S. PATENT DOCUMENTS 5,596,957 A * 1/1997 Ichinose ................. F02B 29/02
123/179.18
5,863,275 A * 1/1999 Nozaki ................. B60W 10/06
477/107

(Continued)

FOREIGN PATENT DOCUMENTS

EP          2599984 A2    6/2013
JP       2013113259 A    6/2013
WO     2005047672 A1    5/2005

*Primary Examiner* — David Hamaoui
*Assistant Examiner* — Carl Staubach
(74) *Attorney, Agent, or Firm* — Alleman Hall Creasman & Tuttle LLP

(57) ABSTRACT

A vehicle comprises an engine including a plurality of combustion chambers; a plurality of throttle valves provided in the plurality of combustion chambers corresponding to the plurality of combustion chambers, respectively, to independently adjust flow rates of intake air flowing into the combustion chambers, respectively; two or more driving mechanisms for electrically driving the plurality of throttle valves divided into two or more groups in such a manner that each of the driving mechanisms drives the throttle valve in a corresponding group of the groups; and a throttle control device for controlling the driving mechanisms based on an amount of throttle operation information input by a rider and a predetermined vehicle state, wherein the throttle control device provides throttle opening rate commands which are made different between the groups, to the driving mechanisms, respectively, when a predetermined output adjustment condition is met.

12 Claims, 11 Drawing Sheets

(51) Int. Cl.
 *F02D 9/10* (2006.01)
 *F02D 41/10* (2006.01)
 *F02D 11/10* (2006.01)
 *B62K 11/04* (2006.01)
(52) U.S. Cl.
 CPC ............ *F02D 11/105* (2013.01); *F02D 41/10* (2013.01); *F02D 2011/102* (2013.01); *F02D 2250/26* (2013.01)
(58) Field of Classification Search
 CPC ...... F02D 9/08; F02D 41/0085; F02D 41/008; F02D 41/0082; Y02T 10/42; Y02T 10/48; F02N 11/0814; F02N 11/0818; F02M 11/02
 See application file for complete search history.

(56) References Cited

U.S. PATENT DOCUMENTS

| | | | | |
|---|---|---|---|---|
| 6,622,695 | B2* | 9/2003 | Kondo | F02B 29/083 123/336 |
| 7,121,258 | B2* | 10/2006 | Nakamoto | F02D 9/109 123/399 |
| 7,237,528 | B2* | 7/2007 | Matsuda | F02D 9/1065 123/336 |
| 8,392,097 | B2* | 3/2013 | Ma | F02D 41/062 123/179.18 |
| 2002/0019692 | A1* | 2/2002 | Yasuoka | B60W 10/06 701/55 |
| 2005/0155571 | A1* | 7/2005 | Hanasato | F02D 9/1095 123/336 |
| 2005/0211220 | A1* | 9/2005 | Matsuda | F02D 9/1065 123/336 |
| 2007/0039586 | A1* | 2/2007 | Maehara | F01L 1/143 123/198 F |
| 2007/0107693 | A1 | 5/2007 | Ohtsuji | |
| 2008/0202474 | A1* | 8/2008 | Matsuda | F01P 1/00 123/478 |
| 2011/0017171 | A1* | 1/2011 | Ochiai | B60T 13/52 123/350 |
| 2011/0160973 | A1* | 6/2011 | Matsuda | B60T 8/1706 701/70 |
| 2013/0030649 | A1* | 1/2013 | Matsuda | B60T 8/1706 701/38 |
| 2013/0066540 | A1* | 3/2013 | Lewis | F02D 41/042 701/113 |
| 2013/0261925 | A1* | 10/2013 | Kobayashi | B60K 28/16 701/85 |
| 2015/0094880 | A1* | 4/2015 | Beard | A63H 17/36 701/2 |
| 2015/0252895 | A1* | 9/2015 | Inoue | F16H 61/66259 701/58 |
| 2016/0144854 | A1* | 5/2016 | Watanabe | B60W 30/02 477/185 |
| 2016/0333801 | A1* | 11/2016 | Tsukahara | F02D 9/02 |
| 2018/0058352 | A1* | 3/2018 | Clarke | F02D 41/0085 |

* cited by examiner

VEHICLE, STRADDLE-TYPE VEHICLE, AND METHOD OF DRIVING THROTTLE VALVE

CROSS-REFERENCE TO THE RELATED APPLICATION

This application claims priority to and the benefit of Japanese Patent Application Nos. 2014-248991 and 2014-248992, filed on Dec. 9, 2014, the entire disclosure of which is incorporated herein by reference.

BACKGROUND OF THE INVENTION

Field of the Invention

The present invention relates to a vehicle, a straddle-type vehicle, and a method of driving a throttle valve.

Description of the Related Art

It is known that a vehicle such as a straddle-type vehicle includes an electronic control throttle which electrically drives a throttle valve for adjusting the flow rate of intake air sent to a combustion chamber of an engine (e.g., see International Application Publication No. WO2005/047672).

By use of the electronic control throttle, an engine output can be controlled based on vehicle states such as the driving state of the vehicle, in addition to a rider's throttle operation.

SUMMARY OF THE INVENTION

However, in the above-described conventional configuration, the same air intake amount control is performed for all cylinders. With such a control, it is difficult to finely adjust the engine output of the whole of the engine in some cases.

The present invention is directed to solving the above-described problem, and an object of the present invention is to provide a vehicle, a straddle-type vehicle, and a method of driving a throttle valve, which can finely adjust an engine output according to the situation.

According to a first aspect of the present invention, a vehicle comprises an engine including a plurality of combustion chambers; a plurality of throttle valves provided in the plurality of combustion chambers to correspond to the plurality of combustion chambers, respectively, to independently adjust flow rates of intake air flowing into the plurality of combustion chambers, respectively; two or more driving mechanisms for electrically driving the plurality of throttle valves divided into two or more groups in such a manner that each of the two or more driving mechanisms drives the throttle valve in a corresponding group of the two or more groups; and a throttle control device for controlling the two or more driving mechanisms based on an amount of throttle operation information input by a rider and a predetermined vehicle state, wherein the throttle control device provides throttle opening rate commands, which are made different between the two or more groups, to the two or more driving mechanisms, respectively, when a predetermined output adjustment condition is met.

In accordance with this configuration, the plurality of throttle valves are divided into the two or more groups, and the throttle opening rates of the throttle valves are electrically controlled for each of the two or more groups. Therefore, the throttle opening rate of the throttle valve can be made different between the groups, and an engine output can be made different between the cylinders of the engine. This makes it possible to finely adjust the engine output according to the situation.

The throttle opening rate commands may include a common throttle opening rate command and an adjustment throttle opening rate command. When the predetermined output adjustment condition is not met, the throttle control device may provide the common throttle opening rate command to the driving mechanisms in response to the throttle operation information input by the rider, and when the predetermined output adjustment condition is met, the throttle control device may provide the common throttle opening rate command to at least one of the two or more driving mechanisms, and the adjustment throttle opening rate command different from the common throttle opening rate command to another driving mechanism of the two or more driving mechanisms. In accordance with this configuration, even when the throttle opening rate of the throttle valve is made different between the groups, the throttle control device maintains the throttle opening rates of the throttle valves in a part of the groups at a value occurring in response to the common throttle opening rate command. Therefore, even when the throttle opening rate occurring in response to the adjustment throttle opening rate command is made significantly different from the throttle opening rate occurring in response to the common throttle opening rate command, the effects of a change in the output of the whole engine can be reduced. As a result, it becomes possible to finely adjust the engine output into a desired one, while preventing a rapid change in the engine output.

A change over time in the throttle opening rate occurring in response to the adjustment throttle opening rate command may be set to be larger than a change over time in the throttle opening rate occurring in response to the common throttle opening rate command. In accordance with this configuration, even when the throttle opening rate of the throttle valve is made different between the groups, the throttle control device maintains the throttle opening rates of the throttle valves in a part of the groups at a value occurring in response to the common throttle opening rate command. Therefore, even when a change over time in the throttle opening rate occurring in response to the adjustment throttle opening rate command is made larger than a change in the throttle opening rate occurring in response to the common throttle opening rate command, the effects of a change in the output in the whole of the engine can be reduced. As a result, it becomes possible to finely adjust the engine output into a desired one while preventing a rapid change in the engine output.

When the throttle control device determines that a requested output increase rate is higher than an output increase rate occurring in response to the common throttle opening rate command, based on the predetermined vehicle state and the throttle operation information input by the rider, the throttle control device may determine that the predetermined output adjustment condition is met. In accordance with this configuration, since the throttle opening rate of the throttle valve is made different between the groups, to increase the output increase rate, namely, the throttle opening rates of the throttle valves in a part of the groups are made larger than those occurring in response to the common throttle opening rate command, and thus the output increase rate can be increased while suppressing a change in a final engine output, as compared to a case where the throttle opening rates of all of the throttle valves are made larger.

When the throttle operation information input by the rider includes a command for increasing an output in a state in which interiors of the combustion chambers are in a non-combustion state, the throttle control device may determine that the predetermined output adjustment condition is met, and provide as the adjustment throttle opening rate command, a command for making a throttle opening rate larger than a throttle opening rate occurring in response to the common throttle opening rate command to the other driving mechanism. In accordance with this configuration, in a case where the throttle operation information input by the rider includes a command for increasing the output in a state in which the interiors of the combustion chambers are in the non-combustion state, the throttle control device makes the throttle opening rates of the throttle valves in a part of the groups larger than those occurring in response to the common throttle opening rate command. Therefore, it becomes possible to prevent a rapid increase in the torque due to sudden ignition of the fuel in the interiors of the combustion chambers during acceleration of the vehicle. As a result, the vehicle can be accelerated smoothly.

When the throttle control device detects that torque is decreased due to an increase in an engine speed, the increase being caused by a driving force different from engine driving power, the throttle control device may determine that the predetermined output adjustment condition is met, and provide as the adjustment throttle opening rate a command for making a throttle opening rate larger than a throttle opening rate occurring in response to the common throttle opening rate command to the other driving mechanism. In accordance with this configuration, in a case where the torque is decreased due to an increase in the engine speed, the increase being caused by a driving force applied from a road surface due to inertia, the weight of the vehicle, or the like, the driving force being different than that resulting from the combustion of the fuel in the interior of the cylinder, the throttle control device makes the throttle opening rates of the throttle valves in a part of the groups larger than those occurring in response to the common throttle opening rate command. This makes it possible to prevent a rapid decrease in the torque due to misfire of the fuel in the interior of the combustion chamber, which is caused by the increase in the engine speed. As a result, the vehicle can be decelerated smoothly.

When the throttle control device detects an increase in an engine speed which is equal to or larger than a predetermined increase amount, the increase being caused by shifting a gear position to increase a reduction gear ratio, in a state in which the vehicle is driving, the throttle control device may determine that the predetermined output adjustment condition is met, and provide as the adjustment throttle opening rate command, a command for making a throttle opening rate larger than a throttle opening rate occurring in response to the common throttle opening rate command to the other driving mechanism. In accordance with this configuration, in a case where the throttle control device detects an increase in the engine speed that is equal to or larger than the predetermined increase amount when the gear position is shifted to increase a reduction gear ratio while the vehicle is being driven, for example, by the shift down, the throttle control device makes the throttle opening rates of the throttle valves in a part of the groups larger than those occurring in response to the common throttle opening rate command. This makes it possible to suppress a decrease in the torque due to an increase in the engine speed, the increase being brought about by shifting the gear position while driving the vehicle. As a result, the gear position can be shifted smoothly.

The vehicle may comprise a drive wheel driven in response to an output of the engine, and when the throttle control device detects or predicts a slip of the drive wheel, the throttle control device may determine that the predetermined output adjustment condition is met, and provide as the adjustment throttle opening rate command, a command for making a throttle opening rate smaller than a throttle opening rate occurring in response to the common throttle opening rate command to the other driving mechanism. In accordance with this configuration, in a situation in which the drive wheel is slipping or is more likely to slip, the throttle control device makes the throttle opening rates of the throttle valves in a part of the groups smaller than those occurring in response to the common throttle opening rate command. This makes it possible to suppress the engine output and hence a slip of the drive wheel, while preventing a rapid change in the vehicle, as compared to a case where the throttle opening rates of all of the throttle valves are made smaller.

The predetermined output adjustment condition may be set based on a posture of a vehicle body of the vehicle. In some situations, depending on the vehicle body posture, a change in the torque of the engine significantly affects the driving state of the vehicle. In view of this, the output is adjusted based on the vehicle body posture, and as a result, the effects of a change in the engine torque on the driving state of the vehicle can be lessened.

The adjustment throttle opening rate command may be set to depend on the throttle operation information input by the rider to a degree less than a degree to which the common throttle opening rate command depends on the throttle operation information. In accordance with this configuration, both of the common throttle opening rate command and the adjustment throttle opening rate command are decided based on the throttle operation information input by the rider, whereas the adjustment throttle opening rate command is set to depend on the throttle operation information to a degree less than a degree to which the common throttle opening rate command does, and thus the throttle opening rates of the throttle valves in a part of the groups are made different from those occurring in response to the common throttle opening rate command. Therefore, even in a case where the throttle opening rates of the throttle valves in a part of the groups are made different from those occurring in response to the common throttle opening rate command, the rider's throttle operation can be reflected in the driving state of the vehicle. As a result, the rider does not feel disconcerted.

According to another aspect of the present invention, a method of driving a plurality of throttle valves provided in a plurality of combustion chambers included in an engine to correspond to the plurality of combustion chambers, respectively, comprises: driving the plurality of throttle valves such that the plurality of throttle valves have throttle opening rates occurring in response to a common throttle opening rate command which depends on throttle operation information input by a rider, when it is determined that a predetermined output adjustment condition is not met; and driving at least one of the plurality of throttle valves such that the throttle valve has a throttle opening rate occurring in response to the common throttle opening rate command and driving another throttle valve of the plurality of throttle valves such that the throttle valve has a throttle opening rate occurring in response to an adjustment throttle opening rate command which depends on the throttle operation information to a degree less than a degree to which the common throttle opening rate command depends, when it is determined that the predetermined output adjustment condition is met.

In accordance with this method, the plurality of throttle valves are divided into the two or more groups, and the throttle opening rate of the throttle valve can be made different between the groups. Therefore, an engine output can be made between the cylinders of the engine. In this way, the engine output can be finely adjusted according to the situation.

According to a further aspect of the present invention, a straddle-type vehicle comprises an engine including a plurality of combustion chambers aligned in series; a plurality of throttle valves provided in the plurality of combustion chambers to correspond to the plurality of combustion chambers, respectively, to independently adjust flow rates of intake air flowing into the plurality of combustion chambers, respectively, the plurality of throttle valves being divided into two or more groups; and two or more driving mechanisms provided to correspond to the two or more groups, respectively, each of the two or more driving mechanisms being configured to drive the throttle valve included in a corresponding group of the two or more groups.

In accordance with this configuration, the two or more driving mechanisms for controlling the throttle valves are divided into two or more systems. Therefore, it becomes possible to control the flow rate of the intake air supplied to the combustion chamber for each of the driving mechanisms. As a result, the engine output can be finely adjusted according to the situation.

The straddle-type vehicle may comprise two or more throttle bodies corresponding to the two or more groups, respectively, each of the throttle bodies in a corresponding group of the two or more groups having a unitary structure, each of the plurality of throttle valves being mounted to a corresponding throttle body of the two or more throttle bodies. In this configuration, since the two or more throttle bodies correspond to the two or more driving mechanisms, respectively, in a one-to-one correspondence, the driving mechanism or the like corresponding to each throttle body can be independently mounted to the engine. Thus, the components of the engine can be easily assembled.

The straddle-type vehicle may comprise two or more biasing mechanisms provided to correspond to the two or more driving mechanisms, respectively, to bias the plurality of throttle valves driven by the two or more driving mechanisms toward closed positions, respectively, and each of the two or more biasing mechanisms may be placed on one side or on the other side between adjacent throttle valves of the plurality of throttle valves. In this configuration, since the biasing mechanisms are placed between the adjacent throttle valves, it is not necessary to place the biasing mechanisms in a location outside of the throttle device. In a conventional structure in which the two or more throttle bodies are connected in series, there exists between the throttle bodies, a mechanism used to connect the valve shafts for driving the throttle valves of the throttle bodies. However, in the above-described configuration, it is not necessary to connect the valve shafts to each other. Therefore, it becomes possible to reduce the length of the throttle device including the throttle bodies, the throttle valves, and the driving mechanisms, in the direction in which the combustion chambers are aligned.

At least two of the two or more driving mechanisms may be placed at both ends in a direction in which the plurality of throttle valves are aligned. In accordance with this configuration, since the driving mechanisms are placed outside of the throttle device, maintenance of the driving mechanisms can be easily performed.

The engine may include four combustion chambers aligned in series, and two throttle bodies may have the same shape, with two throttle valves mounted to each of the two throttle bodies, and the two throttle bodies mounted to the engine in a state in which the two throttle bodies are aligned in series. In accordance with this configuration, since the throttle body of the throttle device is configured as a unit, manufacturing costs of the throttle device can be reduced. If the number of throttle bodies which have the same shape and are aligned is changed, the configuration of the throttle device can be easily changed to be easily applied to various kinds of engines which have different numbers of cylinders. Also, if the four throttle valves are divided into two groups, each including two throttle valves, the length of the rotary shafts of the throttle valves can be reduced. This makes it possible to lessen a torsion generated in the rotary shafts, and hence non-uniformity of the throttle opening rates of the throttle valves.

In accordance with the above-described configuration, the engine output can be finely adjusted according to the situation.

The above and further objects, features and advantages of the present invention will more fully be apparent from the following detailed description of the preferred embodiment with reference to the accompanying drawings.

DETAILED DESCRIPTION OF THE EMBODIMENTS

Hereinafter, the embodiments of the present invention will be described with reference to the drawings. Throughout the drawings, the same or corresponding components are designated by the same reference symbols and will not be described repeatedly. The stated directions are from the perspective of a rider straddling a motorcycle. A vehicle width direction corresponds with a rightward and leftward direction. Although in the embodiments, the present invention is applied to a motorcycle, the present invention is also applicable to vehicles including a straddle-type vehicle such as an all-terrain vehicle (ATV) driven in a state in which a rider straddles a seat, and a four-wheeled automobile, as well as the motorcycle.

Embodiment 1

Figure 1:
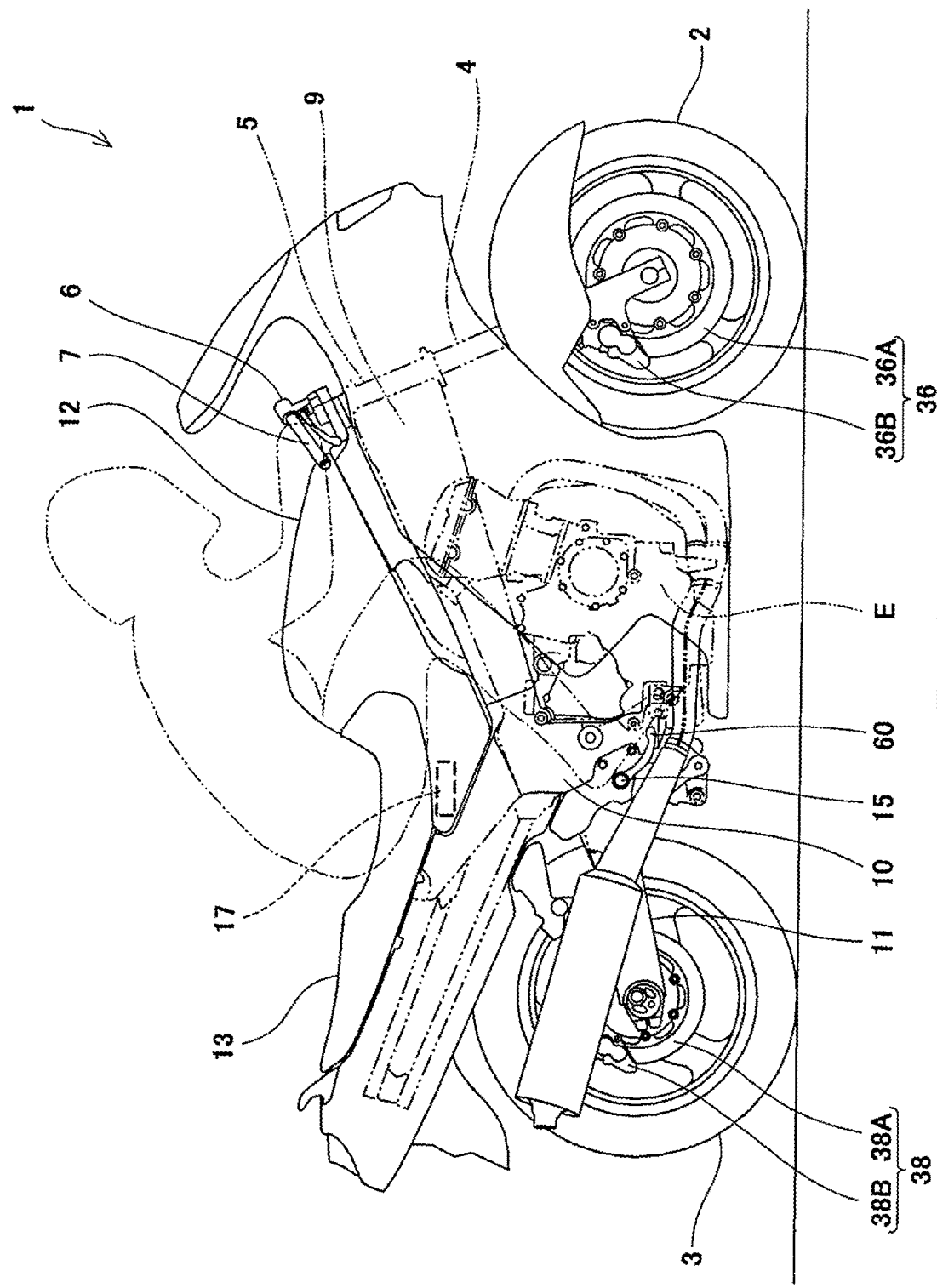
FIG. 1 is a right side view showing a motorcycle according to Embodiment 1 of the present invention.

FIG. 1 is a right side view showing a motorcycle according to Embodiment 1 of the present invention. Referring to FIG. 1, the motorcycle 1 includes a front wheel 2 and a rear wheel 3 which roll on a ground. The rear wheel 3 is a drive wheel and the front wheel 2 is a driven wheel. The front wheel 2 is rotatably mounted to the lower end portion of a front fork 4 extending substantially vertically. The front fork 4 is mounted to a steering shaft (not shown) via an upper bracket (not shown) attached to the upper end portion of the front fork 4 and an under bracket (not shown) placed below the upper bracket. The steering shaft is rotatably supported by a head pipe 5. A bar-type handle 6 extending in a rightward and leftward direction is mounted to the upper bracket. Front wheel brake discs 36A are fastened to the right and left sides of the front wheel 2. A front wheel brake caliper 36B is mounted to the lower end portion of the front fork 4. The front wheel brake discs 36A and the front wheel brake caliper 36B constitute a front wheel brake 36. A piston (not shown) of the front wheel brake caliper 36B is pressed against the front wheel brake disc 36A by oil pressure, and thus a brake force is generated.

A throttle grip 7 attached on a portion of the handle 6, which is gripped by the rider's right hand, is rotated by twisting of the rider's wrist to operate a throttle device 16 (see FIG. 2) which will be described in detail later. The amount of the rotation of the throttle grip 7 is detected by a throttle operation amount sensor 41 (see FIG. 2), and a detection signal indicating the amount of the rotation is sent to an ECU 17 which will be described later, as throttle operation information. A brake lever is placed in front of the throttle grip 7 to activate the front wheel brake 36. A clutch lever (not shown) is placed in front of a grip attached to a portion of the handle 6 which is gripped by the rider's left hand. The rider can change the direction of the front wheel 2 to a desired direction around the steering shaft by rotating the handle 6.

A pair of right and left main frames 9 extend rearward from the head pipe 5 such that the main frames 9 are inclined downward and spaced apart from each other in the rightward and leftward direction. A pair of right and left pivot frames 10 are coupled to the rear portions of the main frames 9, respectively. The front end portion of a swing arm 11 extending in a substantially forward and rearward direction is mounted to the pivot frames 10 such that the swing arm 11 is pivotable. The rear wheel 3 is rotatably mounted to the rear end portion of the swing arm 11. A fuel tank 12 is placed rearward relative to the handle 6. A rider straddle seat 13 is placed behind the fuel tank 12. A rear wheel brake disc 38A is fastened to the right portion of the rear wheel 3, while a rear wheel brake caliper 38B is fastened to the rear end portion of the swing arm 11. The rear wheel brake discs 38A and the rear wheel brake caliper 38B constitute a rear wheel brake 38. A piston (not shown) of the rear wheel brake caliper 38B is pressed against the rear wheel brake disc 38A by oil pressure, and thus a brake force is generated. Right and left footrests 15 on which the rider's feet rest are placed on the right and left sides of the seat 13 and below the seat 13. A brake pedal 60 is pivotally mounted to the right footrest 15 and extends forward. The rider can activate the rear wheel brake 38 by depressing the brake pedal 60 with their right foot.

A brake pressure is detected by a brake pressure sensor 43 (see FIG. 2) and sent to the engine ECU 17. In addition, the rotational speed (front wheel vehicle speed) of the front wheel 2 which is detected by a front wheel vehicle speed sensor 44 (see FIG. 2) and the rotational speed (rear wheel vehicle speed) of the rear wheel 3 which is detected by a rear wheel vehicle speed sensor 45 (see FIG. 2) are sent to the engine ECU 17.

An inertia sensor 46 (see FIG. 2) is attached to the vehicle body in a specified location, to detect the inertia state of the motorcycle 1. The inertia sensor 46 is configured to measure the inclination angles (yaw angle, rolling angle (bank angle), and the pitch angle) of the vehicle body, and acceleration rates (an acceleration rate in a forward and rearward (X-axis) direction, an acceleration rate in a width (Y-axis) direction, and an acceleration rate in a height (Z-axis) direction) of the vehicle body. As the inertia sensor 46 for detecting the inclination angles, for example, a gyro sensor for detecting the angular velocities of the above angles may be used. As the inertia sensor 46 for detecting the acceleration rates, for example, an acceleration sensor for detecting the acceleration rates in the above directions may be used. The inertia sensor 46 is constituted by, for example, the gyro sensor. Each detected inertial state is sent to the engine ECU 17 as inertia information of the vehicle body.

An engine E is placed between the front wheel 2 and the rear wheel 3 and mounted to the main frames 9 and the pivot frames 10. In FIG. 1, an in-line four-cylinder engine is exemplarily shown as the engine E including a plurality of combustion chambers 31. Specifically, the engine E includes four combustion chambers 31. The rotational speed (engine speed) of the output shaft of the engine E is detected by an engine speed sensor 42 (see FIG. 2) and sent to the engine ECU 17 as engine state information.

A transmission (not shown) is coupled to the output shaft of the engine E. Driving power output from this transmission is transmitted to the rear wheel 3 via a chain (not shown). The transmission includes a plurality of gear ratios (gear positions). The gear position is detected by a gear position sensor 47 (see FIG. 2) and sent to the engine ECU 17. The engine ECU 17, which is an engine control device for controlling the throttle device 16, an ignition device (not shown), a fuel injection device (e.g., injector (not shown)), etc., is accommodated in an inner space formed below the seat 13.

Figure 2:
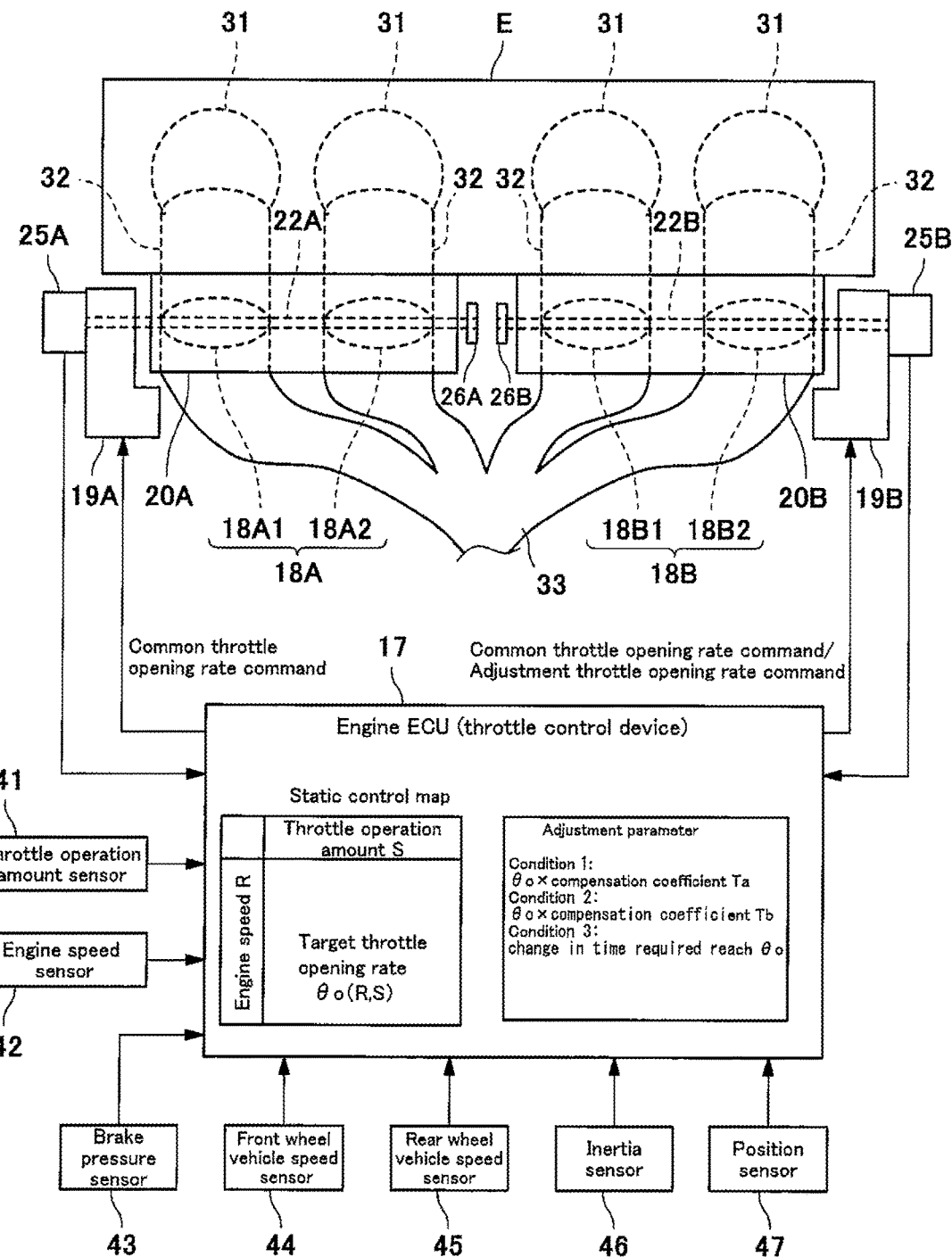
FIG. 2 is a block diagram showing the configuration of a control system associated with a throttle control of the motorcycle of FIG. 1.

FIG. 2 is a block diagram showing the configuration of a control system associated with a throttle control of the motorcycle 1 of FIG. 1. The throttle device 16 is placed between intake ports 32 of the engine E and an intake duct 33 for introducing intake air into the engine E, and connected to the intake ports 32 and the intake duct 33. An air cleaner (not shown) is placed below the fuel tank 12 and connected to the upstream portion of the throttle device 16. The air cleaner is configured to take in outside air by utilizing ram air pressure from the front. In FIG. 2, the exhaust ports of the engine E are omitted.

The throttle device 16 includes a plurality of (four) throttle valves 18A, 18B provided in four combustion chambers 31 of the engine E, each of the throttle valves being configured to independently adjust the flow rate of the intake air supplied to the corresponding combustion chamber 31. In addition, the throttle device 16 includes two or more driving mechanisms 19A, 19B which electrically drive the four throttle valves. The throttle device 16 is controlled by the engine ECU 17 which functions as a throttle control device. In other words, the engine ECU 17 controls each of the two or more driving mechanisms. In this way, in the present embodiment, the throttle device 16 constitutes an electronic control throttle.

In the present embodiment, the throttle device 16 includes two driving mechanisms 19A, 19B. The driving mechanism 19A drives two throttle valves 18A1, 18A2 (will be collectively referred to as throttle valves 18A) of the four throttle valves 18A, 18B. The driving mechanism 19B drives two throttle valves 18B1, 18B2 (will be collectively referred to as throttle valves 18B) of the four throttle valves 18A, 18B. In this way, the four throttle valves 18A, 18B are divided into two groups A, B corresponding to the driving mechanisms 19A, 19B for driving the throttle valves 18A, 18B, respectively. Since the driving mechanisms 19A, 19B for controlling the throttle valves 18A, 18B are divided into two or more systems, it becomes possible to control the flow rate of the intake air to the combustion chamber 31 corresponding to each of the driving mechanisms 19A, 19B. This makes it possible to realize more precise engine control (output control).

The throttle valves 18A are mounted to a throttle body 20A corresponding to the group A, while the throttle valves 18B are mounted to a throttle body 20B corresponding to the group B. The two throttle bodies 20A, 20B are aligned in a direction in which the cylinders are aligned. In other words, the two throttle bodies 20A, 20B are mounted to the engine E which includes the four combustion chambers 31 aligned in series in a state in which the two throttle bodies 20A, 20B are aligned in series. Since the throttle bodies 20A, 20B correspond to the driving mechanisms 19A, 19B, respectively, the driving mechanism 19A or the like corresponding to the throttle body 20A configured as a unit can be mounted independently, and the driving mechanism 19B or the like corresponding to the throttle body 20B configured as a unit can be mounted independently. This makes it possible to easily assemble the components into the engine E. Since each of the throttle bodies 20A, 20B is configured as a unit, manufacturing costs can be reduced.

Figure 3:
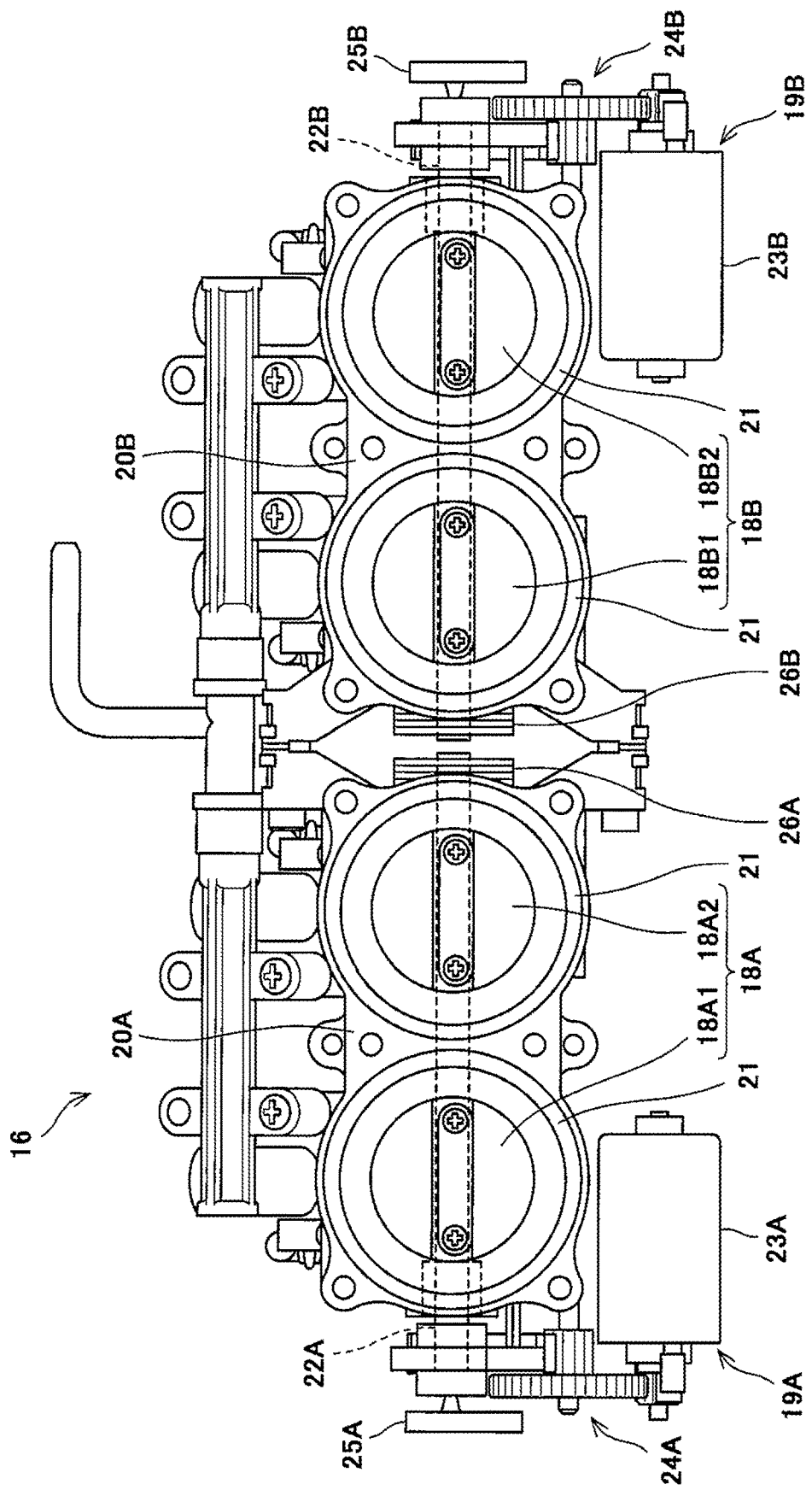
FIG. 3 is a plan view showing the external appearance of a throttle device of the motorcycle of FIG. 1.

FIG. 3 is a plan view showing the external appearance of the throttle device 16 of the motorcycle 1 of FIG. 1. As shown in FIG. 3, the throttle valves 18A are rotatable around a rotary shaft 22A extending in a direction perpendicular to cylindrical intake air introduction ports 21 provided in the throttle body 20A, while the throttle valves 18B are rotatable around a rotary shaft 22B extending in a direction perpendicular to cylindrical intake air introduction ports 21 provided in the throttle body 20B. The rotary shafts 22A, 22B of the throttle valves 18A, 18B are arranged in a direction in which the cylinders are aligned, the rotary shaft 22A is common to the corresponding group A, and the rotary shaft 22B is common to the corresponding group B. Specifically, the throttle valves 18A1, 18A2 belonging to the group A are fastened to the rotary shaft 22A, while the throttle valves 18B1, 18B2 belonging to the group B are fastened to the rotary shaft 22B. In this way, the rotary shafts 22A, 22B for driving the plurality of throttle valves 18A, 18B of the present embodiment, respectively, are divided in the rightward and leftward direction (namely, the direction in which the cylinders are aligned).

The rotary shafts 22A, 22B are coaxial with each other. However, the layout of the rotary shafts 22A, 22B is not limited to this. For example, the rotary shafts 22A, 22B may be placed at different locations in the flow direction (axial direction of the intake air introduction ports 21) of the intake air passing through the throttle valves 18A, 18B.

The driving mechanism 19A includes a motor 23A which generates rotational driving power for driving the rotary shaft 22A, and a link mechanism 24A connecting the output shaft of the motor 23A to the rotary shaft 22A of the throttle valves 18A. The driving mechanism 19B includes a motor 23B which generates rotational driving power for driving the rotary shaft 22B, and a link mechanism 24B connecting the output shaft of the motor 23B to the rotary shaft 22B of the throttle valves 18B. The link mechanisms 24A, 24B include, for example, a plurality of reduction gears with a specified reduction gear ratio. In the present embodiment, the motors 23A, 23B have equal capabilities (e.g., maximum output, maximum rotational speed, maximum torque, etc.). The link mechanisms 24A, 24B are configured to provide an equal reduction gear ratio.

The driving mechanism 19A includes a throttle opening rate sensor 25A for detecting the rotational angle (throttle opening rate) of the rotary shaft 22A of the throttle valves 18A, while the driving mechanism 19B includes a throttle opening rate sensor 25B for detecting the rotational angle (throttle opening rate) of the rotary shaft 22B of the throttle valves 18B. The throttle opening rate sensors 25A, 25B are constituted by, for example, rotary encoders, respectively. The link mechanism 24A is placed between the throttle body 20A and the throttle opening rate sensor 25A, while the link mechanism 24B is placed between the throttle body 20B and the throttle opening rate sensor 25B.

As described above, the motor 23A, 23B, the link mechanism 24A, 24B, and the throttle opening rate sensor 25A, 25B are provided to correspond to each of the groups. Since the four throttle valves 18A1, 18A2, 18B1, 18B2 are driven by the two motors 23A, 23B, the driving power required for each of the motors 23A, 23B can be reduced compared to a case where the four throttle valves are driven by one motor. This makes it possible to reduce the size of the motors 23A, 23B.

Further, the rotary shafts 22A, 22B of the throttle valves 18A, 18B can be shortened compared to a case where all of the four throttle valves 18A, 18B are driven by one motor. This makes it possible to lessen a torsion generated in the rotary shafts 22A, 22B, and non-uniformity of the throttle opening rates of the throttle valves 18A, 18B.

The four throttle valves 18A, 18B are driven by the two or more driving mechanisms 19A, 19B. In this configuration, if an abnormality occurs in a particular driving mechanism, for example, an abnormality occurs in the motor 23A, the link mechanism 24A, or the throttle opening rate sensor 25A of the driving mechanism 19A, the engine ECU 17 closes the throttle valves 18A of this driving mechanism 19A, causes the corresponding fuel injection device to cease fuel injection, gradually reduces the throttle opening rates of the throttle valves 18B of the other driving mechanism 19B, and controls the amount of the fuel injected from the fuel injection device corresponding to the driving mechanism 19B, according to the gradual reduction of the throttle opening rates. This makes it possible to mitigate an impact on the vehicle body which would be generated by closing all of the throttle valves 18A, 18B and increase a time period for which the engine control can be performed to increase a period for which the motorcycle 1 can continue to drive, in a case where an abnormality occurs in one of the driving mechanisms 19A, 19B.

Since the two or more throttle opening rate sensors 25A, 25B are provided for one engine E, it is not necessary to additionally provide a safety device. For example, it is not necessary to provide a double sensor (provide a plurality of sensors in the same location). In this configuration, for example, in a case where the two or more driving mechanisms drive the throttle valves in response to a common throttle opening rate command, the engine ECU 17 can determine that an abnormality has occurred in one of the driving mechanisms 19A, 19B, when a difference between throttle opening rate values detected by the corresponding two or more throttle opening rate sensors 25A, 25B becomes equal to or larger than a predetermined value. In addition, since the two or more control systems are provided for one engine E, a circuit load for the engine control can be lessened. For example, even in a case where circuits and wires used to supply electric power to the motors 23A, 23B supply the electric power to the throttle opening rate sensors 25A, 25B and receive signals to demonstrate a performance similar to that of a conventional configuration in which all of the throttle valves are controlled by one control system, the loads imposed on the circuits and the wires can be made much less than allowable values therein.

When viewed from above (see FIG. 3), the motors 23A, 23B are placed to overlap with the corresponding throttle bodies 20A, 20B, respectively, in a direction perpendicular to the direction in which the throttle bodies 20A, 20B (throttle valves 18A, 18B) are aligned. This makes it possible to reduce the length of the throttle device 16 in the direction in which the throttle bodies 20A, 20B are aligned. The motors 23A, 23B are placed such that their output shafts are parallel to the rotary shafts 22A, 22B, respectively.

The throttle device 16 includes two biasing mechanisms 26A, 26B provided to correspond to the driving mechanisms 19A, 19B, respectively. The biasing mechanisms 26A, 26B bias the throttle valves 18A, 18B, driven by the driving mechanisms 19A, 19B, to close the throttle valves 18A, 18B. More specifically, the biasing mechanisms 26A, 26B are configured to bias the rotary shafts 22A, 22B around the axes of the rotary shafts 22A, 22B, respectively. The biasing mechanisms 26A, 26B are constituted by, for example, coil springs, respectively.

Since the biasing mechanisms 26A, 26B are placed between the throttle bodies 20A, 20B, it is not necessary to provide the biasing mechanisms 26A, 26B in locations outside of the throttle bodies 20A, 20B. In a conventional structure in which a plurality of throttle bodies are connected in series, there exists between the throttle bodies, a mechanism for connecting the rotary shafts for driving the throttle valves of the throttle bodies. In contrast, in the configuration of the present embodiment, it is not necessary to connect these rotary shafts. Therefore, by placing the biasing mechanisms 26A, 26B between the throttle bodies 20A, 20B, the length of the throttle device 16 including the throttle bodies 20A, 20B, the throttle valves 18A, 18B, and the driving mechanisms 19A, 19B, in the direction in which the combustion chambers 31 are aligned, can be reduced. At an end portion on one side of the engine E in the direction in which the combustion chambers 31 are aligned (e.g., at an end portion close to the driving mechanism 19B), there is placed a cam chain (not shown), which is a valve operating mechanism for transmitting the rotational driving power of the output shaft of the engine E to a camshaft for opening and closing an intake valve and an exhaust valve. In this layout, even when the driving mechanism 19B is placed to protrude from the throttle body 20B in the direction in which the combustion chambers 31 are aligned in such a manner that at least a portion of the driving mechanism 19B overlaps with the cam chain when viewed from above, the length of the throttle device 16 in the direction in which the combustion chambers 31 are aligned, is not increased, as compared to the conventional structure in which the plurality of throttle bodies are connected in series. In other words, since it is not necessary to provide the biasing mechanism in the location outside of the throttle body 20A, as compared to the above-described conventional structure, the length of the throttle device 16 in the direction in which the combustion chambers 31 are aligned can be reduced. Alternatively, the biasing mechanisms 26A, 26B may be omitted.

The motors 23A, 23B constituting the driving mechanisms 19A, 19B, respectively, are placed on an opposite side of injectors (not shown) with respect to the throttle bodies 20A, 20B, in a direction perpendicular to the direction in which the throttle valves 18A, 18B are aligned. This makes it possible to prevent interference between pipes (not shown) used to feed fuel to the injectors and the motors 23A, 23B.

The engine ECU 17 is electrically connected to the motors 23A, 23B of the driving mechanisms 19A, 19B, and the throttle opening rate sensors 25A, 25B. The engine ECU 17 outputs current signals as the throttle opening rate commands to the motors 23A, 23B, respectively. The motors 23A, 23B rotate the rotary shafts 22A, 22B of the corresponding throttle valves 18A, 18B, respectively, in response to the throttle opening rate commands provided by the engine ECU 17. According to the rotations of the rotary shafts 22A, 22B, the throttle opening rates of the throttle valves 18A, 18B are changed. The current signals sent from the engine ECU 17 are the driving currents of the motors 23A, 23B, respectively. The throttle opening rate sensors 25A, 25B detect the rotational angles of the rotary shafts 22A, 22B, respectively, and feed the rotational angles back to the engine ECU 17.

Alternatively, the engine ECU 17 may be electrically connected to the driving mechanisms 19A, 19B, via separate wires, or may be selectively electrically connected to the driving mechanism 19A or 19B, to provide the throttle opening rate command to the driving mechanism 19A or 19B to be driven.

The throttle bodies 20A, 20B have a symmetric shape with respect to a center portion in the direction in which the throttle valves 18A, 18B are aligned. In the present embodiment, the biasing mechanisms 26A, 26B are placed between the adjacent throttle bodies 20A, 20B. More specifically, the biasing mechanisms 26A, 26B are attached to the inner end portions of the rotary shafts 22A, 22B, respectively, in the direction in which the throttle valves 18A, 18B are aligned. The driving mechanisms 19A, 19B are placed on the outer sides of the adjacent throttle bodies 20A, 20B, respectively, in the direction in which the throttle bodies 20A, 20B are aligned. The driving mechanisms 19A, 19B are mounted to the outer end portions of the rotary shafts 22A, 22B, respectively. In this configuration, since the driving mechanisms 19A, 19B are placed outside of the throttle device 16, maintenance of the driving mechanisms 19A, 19B can be easily performed.

The engine ECU 17 which functions as the throttle control device is configured to provide the throttle opening rate commands which are made different between the groups, to the driving mechanisms 19A, 19B, respectively, when a predetermined output adjustment condition is met. Specifically, when the output adjustment condition is not met, the engine ECU 17 performs the common control in which the engine ECU 17 provides the common throttle opening rate command to both of the driving mechanisms 19A, 19B, in response to the throttle operation information input by the rider. On the other hand, when the output adjustment condition is met, the engine ECU 17 performs a group-based control in which the engine ECU 17 provides the common throttle opening rate command to the driving mechanism 19A of the group A, and an adjustment throttle opening rate command to the driving mechanism 19B of the group B. The term "group-based control" is defined as a control independently performed for each of the groups. The adjustment throttle opening rate command is different from the common throttle opening rate command. The engine ECU 17 contains the output adjustment conditions, the content of the common control, the content of the group-based control, and programs indicating the flows of the controls. The engine ECU 17 executes the programs to function as the throttle control device.

In accordance with this configuration, the plurality of (four) throttle valves 18A1, 18A2, 18B1, 18B2 are divided into two groups A, B. The throttle opening rates of the throttle valve 18A of the group A and the throttle opening rates of the throttle valve 18B of the group B are independently electrically controlled. In this configuration, the throttle opening rate can be made different between the groups A, B. Therefore, the amount of intake air supplied to the combustion chambers 31 can be made different between the groups A, B, and hence the output obtained in the cylinders of the engine E can be made different between the groups A, B. This makes it possible to finely adjust the engine output according to the situation.

The engine ECU 17 provides the common throttle opening rate command which is the same as that used in the common control to the group A of the two groups A, B, during the group-based control in which the throttle opening rate of the throttle valve is made different between the groups A, B. Therefore, a change in the output of the whole of the engine E can be reduced, even when the throttle opening rates occurring in response to the adjustment throttle opening rate command provided to the remaining group B are significantly different from those occurring in response to the common throttle opening rate command. As a result, it becomes possible to finely adjust the engine output to obtain a desired one while preventing a significant change in the engine output.

For example, in a case where the engine ECU 17 provides the common throttle opening rate command to all of the throttle valves 18A, 18B, it is difficult to adjust the engine output in a throttle opening rate range during a low output state in which the interiors of the combustion chambers 31 are in a transient state between a non-combustion state and a combustion state. However, in the present embodiment, the throttle opening rates of the throttle valves 18B of the group B (of the two groups A, B) are controlled such that the interiors of the combustion chambers 31 become the combustion state. Thus, the engine output during the low output state can be easily adjusted. In some cases, for example, inertia occurs in the flow of the intake air, and thus there is a lag between a timing when the throttle opening rate changes and a timing when the engine output changes responsively to the change in the throttle opening rate. In this case, the lag in the change in the engine output can be suppressed, by increasing the speed at which the throttle valves 18B of the group B are opened and closed.

The engine ECU 17 receives as inputs engine state information such as the engine speed, throttle operation information input by the rider (hereinafter will be referred to as the rider's throttle operation information), and other vehicle state information, which are detected by the above-described sensors 41 to 47. The vehicle state information includes a vehicle speed, slip information based on a vehicle speed difference between the front and rear wheels 2, 3, a brake pressure, bank information of the vehicle body, etc.

The output adjustment condition is set primarily based on the vehicle state information. The output adjustment condition is also set based on the engine state information, to indirectly obtain the vehicle state. However, a case where the output adjustment condition is set based on only the engine state information does not occur.

The engine ECU 17 contains, for example a static control map indicating the value of a target throttle opening rate (target throttle opening rate of throttle valve) θo defined in correspondence with a throttle operation amount S (throttle operation position) of the rider's throttle operation, and an engine speed R. The engine ECU 17 generates the common throttle opening rate command with reference to the static control map.

Further, during the common control in which the engine ECU 17 provides the common throttle opening rate command to both of the driving mechanisms 19A, 19B, a target throttle opening rate different from the target throttle opening rate defined in the control map based on the engine state, the vehicle state, and the like may be used as the common throttle opening rate command. Even in this case, the common throttle opening rate command is provided to both of the driving mechanisms 19A, 19B, and therefore, the throttle valves 18A, 18B are driven in the same manner.

When the output adjustment condition is met, the engine ECU 17 generates the adjustment throttle opening rate command based on the vehicle state information. The adjustment throttle opening rate command is generated in such a manner that, for example, a corresponding value in the static control map which is used to generate the common throttle opening rate command is compensated by use of an adjustment parameter corresponding to the condition. In other words, the adjustment throttle opening rate command is generated in a dynamic manner as compared to the common throttle opening rate command. For example, the ECU 17 reads a target throttle opening rate corresponding to the throttle operation amount and the engine speed, from the static control map, and multiplies this target throttle opening rate by a specified compensation coefficient according to the output adjustment condition and the vehicle state information, to obtain the throttle opening rate. When the compensation coefficient is larger than 1, the throttle opening rate which is larger by a specified ratio than the target throttle opening rate is obtained, while when the compensation coefficient is smaller than 1, the throttle opening rate which is smaller by a specified ratio than the target throttle opening rate is obtained. Further, the time when the throttle opening rate reaches the target throttle opening rate (the amount of a change over time in the throttle opening rate) may be changed without changing the target throttle opening rate.

Alternatively, the engine ECU 17 may contain a control map corresponding to the vehicle state information. Specifically, the target throttle opening rate corresponding to the vehicle state information may be defined in advance based on the throttle operation amount and the engine speed.

In any case, the adjustment throttle opening rate command is set to depend on the rider's throttle operation information to a lesser degree than that by which the common throttle opening rate command does. This means that both of the common throttle opening rate command and the adjustment throttle opening rate command are decided based on the rider's throttle operation information, whereas the degree to which the adjustment throttle opening rate command depends on the rider's throttle operation information is smaller than that by which the common throttle opening rate command does, and thus, the throttle opening rates of the throttle valves 18B of a part of the groups are set to be different from those occurring in response to the common throttle opening rate command. Therefore, even in the case where the throttle opening rates of the throttle valves 18B are set to be different from those occurring in response to the common throttle opening rate command, the rider's throttle operation is reflected by the throttle opening rates of the throttle valves. This makes it possible to prevent the rider from feeling disconcerted.

The phrase "the adjustment throttle opening rate command depends on the rider's throttle operation information to a lesser degree than that by which the common throttle opening rate command does" means that the amount of change in the command value occurring in response to the rider's throttle operation information is small, and/or the amount of change in the command value occurring in response to input information other than the rider's throttle operation information is large. The phrase "the adjustment throttle opening rate command depends on the rider's throttle operation information to a lesser degree than that by which the common throttle opening rate command does" may include a case where the adjustment throttle opening rate command is not affected by the rider's throttle operation information.

As described above, in the present embodiment, all of the throttle valves 18A, 18B are controlled to be driven during the group-based control as well as during the common control. The throttle valves 18A, 18B are also controlled to be driven so that an actual output becomes close to the output (throttle operation amount) requested by the rider, during the group-based control. The engine ECU 17 independently controls the fuel injection amounts of the fuel injection devices provided to correspond to the combustion chambers 31, respectively, based on the throttle opening rates of the throttle valves 18A, 18B provided in the corresponding combustion chambers 31, respectively. In brief, the fuel injection amount of each of the fuel injection devices, belonging to the group A or the group B, is independently controlled. Note that an air-fuel ratio, namely, a ratio of fuel feed amount with respect to an intake air amount, is controlled at a predetermined value, during the common control and the group-based control.

Hereinafter, several examples of the group-based control in a case where the output adjustment condition is met will be described in conjunction with the output adjustment conditions.

[Slight Opening Control]

For example, when the engine ECU 17 determines that a requested output increase rate is larger than an output increase rate occurring in response to the common throttle opening rate command based on the vehicle state and the rider's throttle operation information, the engine ECU 17 determines that the output adjustment condition is met. Specifically, for example, in a case where the rider's throttle operation information includes a command for increasing the output in a state in which the interiors of the combustion chambers 31 are in the non-combustion state, the engine ECU 17 determines that the output adjustment condition is met. More specifically, in a case where a torque increase smaller than a predetermined increase amount is detected when the throttle operation amount and the engine speed increase, the engine ECU 17 determines that the output adjustment condition is met.

Figure 4:
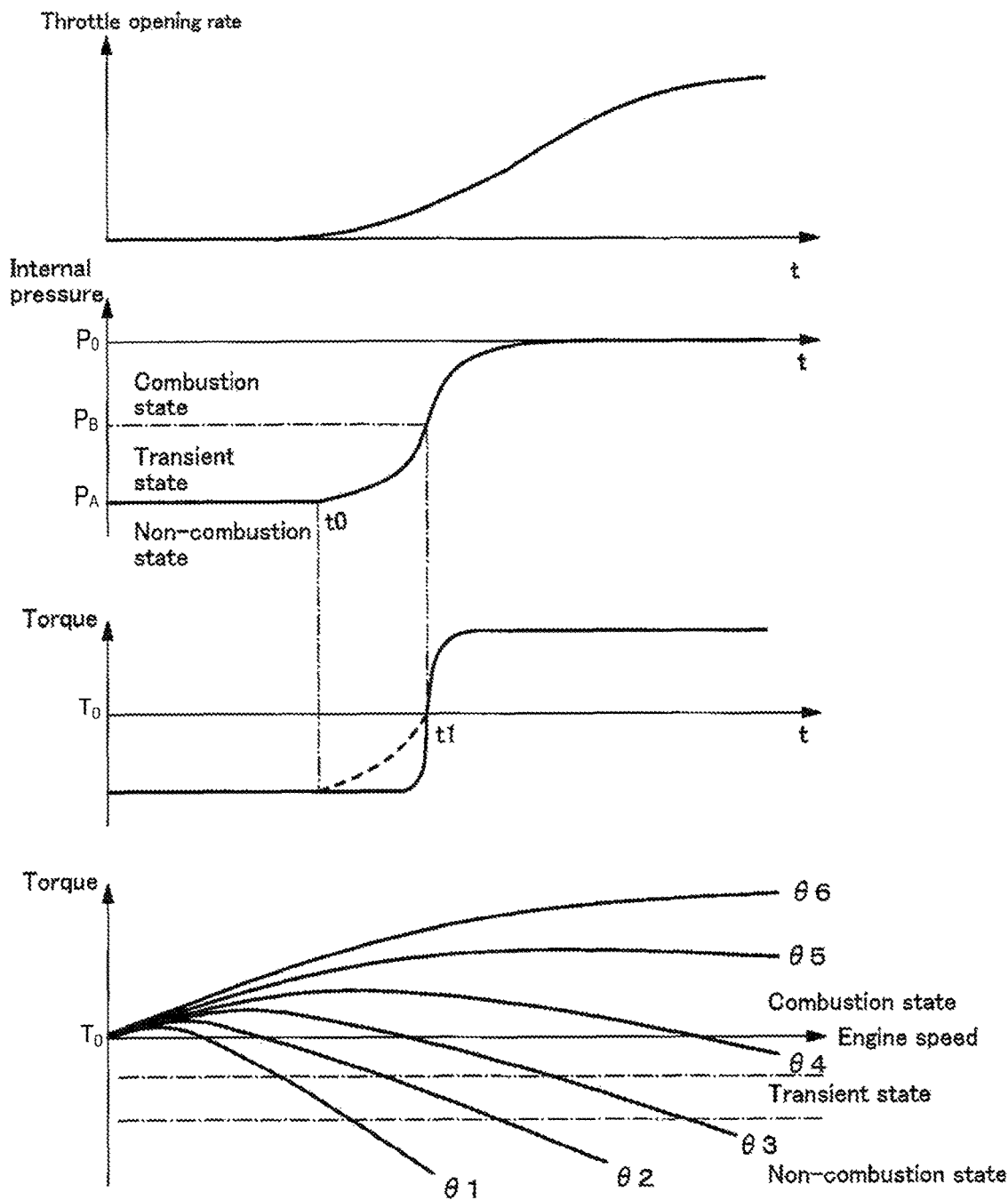
FIG. 4 is a graph showing changes over time in a throttle opening rate, a combustion chamber internal pressure, and torque, and changes with respect to an engine speed in throttle opening rates, in an exemplary situation in which the interior of each of the combustion chambers tends to be in a non-combustion state.

FIG. 4 is a graph showing changes over time in the throttle opening rate of the throttle valve, a combustion chamber internal pressure, and torque, and changes with respect to the engine speed in the throttle opening rates, in an exemplary situation in which the interior of each of the combustion chambers 31 tends to be in the non-combustion state. Referring to FIG. 4, in a case where the engine speed is higher than a predetermined engine speed and the amount of a change in the throttle opening rate of the throttle valve is small, for example, a case where the motorcycle 1 is gradually accelerated in a stopped state, the interior of each of the combustion chambers 31 is in the non-combustion state, namely, a state in which a part of the fuel injected from the fuel injection device is not combusted (time before time t0).

In this case, if the throttle opening rate is increased to increase the amount of air introduced into the combustion chamber 31, the internal pressure of the combustion chamber 31 is increased (the internal pressure of FIG. 4 changes from Pa to Pb), the fuel in the interior of the combustion chamber 31 is ignited, and thus the non-combustion state shifts to the combustion state, namely, a state in which a large part of the fuel injected from the fuel injection device is combusted. However, in a time period when the internal pressure changes from Pa to Pb, namely, a time period from time t0 to time t1, the interior of the combustion chamber 31 is in the transient state in which the fuel may or may not be combusted. Due to the presence of this transient state, the change from the non-combustion state to the combustion state is delayed with respect to the change in the throttle opening rate. The torque output from the engine E increases as a result of the combustion occurring in the combustion chamber 31. For this reason, the delay of the change from the non-combustion state to the combustion state results in the delay of the increase in the torque. During the transient state, the actual output increase rate is smaller than the output increase rate occurring in response to the common throttle opening rate command, and therefore the requested output increase rate, indicated by a broken line in the graph showing the change over time in the torque, is larger than the output increase rate occurring in response to the common throttle opening rate command, indicated by a solid line in the same graph. The amount of the fuel present in the interior of the combustion chamber 31 at a time point when the combustion state is formed, is a sum of the amount of the fuel injected from the fuel injection device for the time period that lapses from the non-combustion state to the transient state, and the amount of the fuel injected from the fuel injection device at the time point when the combustion state is formed. As soon as the fuel in the interior of the combustion chamber 31 is ignited and the combustion starts, the torque increases rapidly (time t1), and an impact may be generated in the vehicle body. In particular, in the straddle-type vehicle which is lighter in weight and experiences a larger change in vehicle body posture when driven than an automobile does, the impact generated due to the rapid change in the engine output significantly affects the vehicle body.

To mitigate such an impact, it is necessary to slightly increase the amount of air introduced into the combustion chambers 31. However, it is difficult to perform a control to slightly increase the throttle opening rates of all of the throttle valves 18A, 18B of the engine E, because the change amounts of the throttle opening rates are small.

In light of the above, the engine ECU 17 performs a slight opening control (control in slight opening) in such a manner that the engine ECU 17 maintains the throttle opening rates of the throttle valves 18A of the group A (a part of the groups) at a value occurring in response to the common throttle opening rate command, and provides as the adjustment throttle opening rate command, a command for making the throttle opening rate of the throttle valve larger than that occurring in response to the common throttle opening rate command to the throttle valves 18B of the group B (remaining group). This makes it possible to make the amount of change in the throttle opening rates of the throttle valves 18B larger than that in the throttle opening rates of the throttle valves 18A, while slightly increasing the amount of air introduced into the whole of the engine E. For this reason, the output increase rate can be increased while preventing a rapid change in the engine output. Therefore, the torque can exhibit a better response to the change in the throttle opening rates while suppressing the impact on the vehicle body, as compared to a case where the throttle opening rates of all of the throttle valves 18A, 18B are increased. In other words, the actual change in torque can be made close to the change indicated by the broken line of the graph of FIG. 4. Therefore, it becomes possible to prevent a situation in which the torque increases rapidly due to sudden ignition of the fuel in the interiors of the combustion chambers 31 during acceleration of the motorcycle 1. As a result, the motorcycle 1 is accelerated smoothly.

The throttle opening rate occurring in response to the adjustment throttle opening rate command may be such that a change over time in this throttle opening rate is set to be larger than the change over time in response to the common throttle opening rate command, in addition to or instead of the change in the target throttle opening rate. In this setting, even when the change over time in the throttle opening rate in response to the adjustment throttle opening rate command is set to be larger than that occurring in response to the common throttle opening rate command, the change in the output of the whole of the engine E can be reduced. Therefore, the output increase rate can be increased while preventing a rapid change in the engine output.

Figure 5:
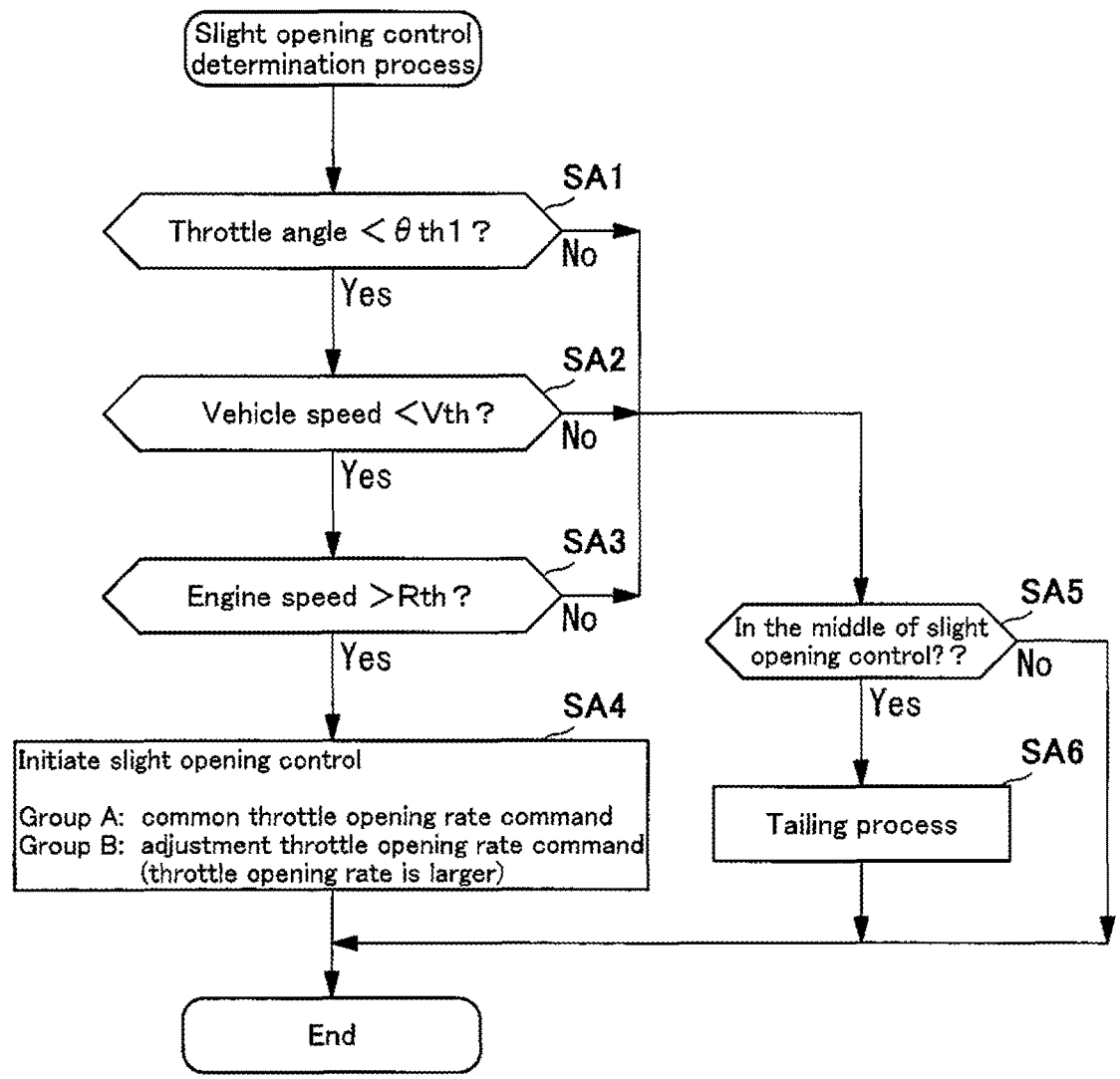
FIG. 5 is a flowchart showing the flow of a determination process in a slight opening control according to the present embodiment.

FIG. 5 is a flowchart showing the flow of a determination process in the slight opening control according to the present embodiment. Referring to FIG. 5, the engine ECU 17 detects the throttle opening rate and determines whether or not the detected throttle opening rate is smaller than a predetermined threshold $\theta th1$ of the throttle opening rate (step SA1). The throttle opening rate used in the determination may be the rotational angle (actual throttle opening rate) of the throttle valve 18A, 18B detected by the throttle opening rate sensor 25A, 25B, or the amount of the rotation (throttle operation amount) of the throttle grip 7 which is detected by the throttle operation amount sensor 41.

When the engine ECU 17 determines that the throttle opening rate is smaller than the predetermined threshold $\theta th1$ (Yes in step SA1), the engine ECU 17 detects a vehicle speed, and determines whether or not the detected vehicle speed is lower than a predetermined threshold Vth of the vehicle speed (step SA2). When the engine ECU 17 determines that the vehicle speed is lower than the predetermined threshold Vth (Yes in step SA2), the engine ECU 17 detects the engine speed, and determines whether or not the detected engine speed is higher than a predetermined threshold Rth of the engine speed (step SA3).

When the engine ECU 17 determines that the engine speed is higher than the predetermined threshold Rth (Yes in step SA3), to be precise, when throttle opening rate is smaller than the predetermined threshold $\theta th1$, the vehicle speed is lower than the predetermined threshold Vth, and the engine speed is higher than the predetermined threshold Rth, the engine ECU 17 determines that the requested output increase rate is larger than the output increase rate occurring in response to the common throttle opening rate command, and initiates the above-described slight opening control (step SA4). On the other hand, when one of the conditions, which are the throttle opening rate, the vehicle speed, and the engine speed, is not met (No in step SA1, SA2, or SA3), the engine ECU 17 determines whether or not the slight opening control is being performed (step SA5). When the engine ECU 17 determines that the slight opening control is being performed (Yes in step SA5), the engine ECU 17 performs a tailing process, and shifts from the slight opening control to the common control in which the engine ECU 17 provides the common throttle opening rate command to both of the driving mechanisms 19A, 19B (step SA6).

The engine ECU 17 may contain a function used to derive the state (non-combustion state, the transient state, or the combustion state) of the interior of the combustion chamber 31 of the engine E based on the throttle opening rate (or air-intake pressure may be used) and the engine speed, in addition to or instead of the predetermined threshold $\theta th1$ of the throttle opening rate, the predetermined threshold Vth of the vehicle speed, and the predetermined engine speed Rth of the engine speed, derive the state in the interior of the combustion chamber 31 based on the value of the throttle opening rate (or the air-intake pressure) and the value of the engine speed, with reference to this function, and determine that the output adjustment condition is met when the derived state is the non-combustion state or the transient state.

The function may be stored as a map which defines the state of the interior of the combustion chamber 31 in association with the value of the throttle opening rate (or the air-intake pressure) and the value of the engine speed. Further, the function may be stored as a calculation formula which uses as inputs the value of the throttle opening rate (or the air-intake pressure) and the value of the engine speed and defines the state of the interior of the combustion chamber 31 in correspondence with a calculation value resulting from the calculation. The function can be preliminarily derived based on a simulation or a test conducted for an actual vehicle.

[Control Performed when a Driving Force Other than Engine Driving Power is Generated]

For example, in a case where the engine speed is increased in a state in which the throttle opening rate is constant, and thereby the state of the interior of the combustion chamber 31 is more likely to shift to the transient state, the engine ECU 17 may provide as the adjustment throttle opening rate command, a command for making the throttle opening rate of the throttle valve larger than that occurring in response to the common throttle opening rate command so that the interior of the combustion chamber 31 becomes the combustion state.

For example, in a case where the engine ECU 17 determines that the torque is decreased due to an increase in the engine speed, the increase being caused by a driving force different from the engine driving power, the engine ECU 17 determines that the output adjustment condition is met. In some cases, the engine speed is increased due to a factor other than the combustion of the fuel in the interior of the cylinder. In this case, since the engine speed is increased even in a state in which the throttle opening rate is constant, the interior of the combustion chamber 31 of the engine E is likely to become the non-combustion state. In this case, the engine ECU 17 provides as the adjustment throttle opening rate command, a command for making the throttle opening rate of the throttle valve larger than that occurring in response to the common throttle opening rate command so that the state of the interior of the combustion chamber 31 of the engine E becomes the transient state or the combustion state.

Driving forces different from the engine driving power, for example, a force for rotating the drive wheel by the inertial force of the motorcycle 1 being driven, are generated. The drive wheel is rotated by the inertial force, and thus the driving force is transmitted from the drive wheel to the engine E via a driving power transmission mechanism. The driving forces different from the engine driving power include, for example, a force provided by a gravitational force during driving on a downward slope, a force provided by following wind blowing toward the vehicle body when the vehicle is driven, etc., in addition to the above inertial force.

The torque is decreased due to an increase in the engine speed which is caused by the above-described driving forces. In a case where the engine ECU 17 determines that the torque is decreased due an increase in the engine speed, the engine ECU 17 determines that the output adjustment condition is met, and performs the group-based control in which the engine ECU 17 provides as the adjustment throttle opening rate command, a command for making the throttle opening rate of the throttle valve larger than that occurring in response to the common throttle opening rate command. For example, in a case where the interior of the combustion chamber 31 temporarily becomes the transient state during generation of an engine braking force by the shift down, as will be described later, the engine ECU 17 may determine that an increase in the engine speed which is equal to or larger than a predetermined increase amount (decrease in the torque which is equal to or larger than a predetermined amount) has occurred.

Further, at a time point when the interiors of the combustion chambers 31 shift from the non-combustion state or the transient state to the combustion state, as a result of the above-described group-based control, the engine ECU 17 may provide the common throttle opening rate command to the throttle valves 18B to which the adjustment throttle opening rate command was provided. In other words, the engine ECU 17 may return to the common control.

[Deceleration Control]

For example, in a case where the engine ECU 17 determines that a requested output decrease rate is larger than an output decrease rate occurring in response to the common throttle opening rate command, based on the vehicle state and the rider's throttle operation information, the engine ECU 17 determines that the output adjustment condition is met. Specifically, for example, in a case where the rider's throttle operation information includes a command for decreasing the output and the interiors of the combustion chambers 31 are going to shift to the transient state or the non-combustion state, the engine ECU 17 determines that the output adjustment condition is met. More specifically, in a case where a decrease in the torque which is larger than a predetermined decrease amount is detected when the throttle operation amount and the engine speed are decreased, the engine ECU 17 determines that the output adjustment condition is met. In a case where the throttle opening rate is reduced when the engine speed is decreased during deceleration or the like, the interior of the combustion chamber 31 sometimes shifts from the combustion state to the non-combustion state by way of the transient state according to a flow which is the reverse of the above-described flow of FIG. 5. As described previously, in the transient state, the fuel is not easily ignited, and as a result, the torque is decreased at once.

Therefore, in a case where a decrease in the torque which is equal to or larger than the predetermined decrease amount is detected when the engine speed is decreased, the engine ECU 17 determines that the output adjustment condition is met. In this case, the engine ECU 17 performs a deceleration control (control in deceleration) in which the engine ECU 17 provides as the adjustment throttle opening rate command, a command for making the throttle opening rate of the throttle valve larger than that occurring in response to the common throttle opening rate command. As in the slight opening control, during the deceleration control, the engine ECU 17 maintains the throttle opening rates of the throttle valves 18A of the group A (a part of the groups) at a value occurring in response to the common throttle opening rate command, and provides as the adjustment throttle opening rate command, a command for making the throttle opening rate of the throttle valve larger than that occurring in response to the common throttle opening rate command to the throttle valves 18B of the group B (remaining group). The throttle opening rate occurring in response to the adjustment throttle opening rate command during engine brake control may be such that a change over time in this throttle opening rate is set to be smaller than the change over time in the throttle opening rate occurring in response to the common throttle opening rate command, in addition to or instead of the change in the target throttle opening rate.

By the above-described deceleration control, it becomes possible to prevent a situation in which the interiors of the combustion chambers 31 of all of the cylinders become the non-combustion state during deceleration of the motorcycle 1. As a result, a rapid decrease in the torque can be prevented, and the motorcycle 1 is decelerated smoothly.

[Engine Brake Control (Blipping Control)]

Figure 6:
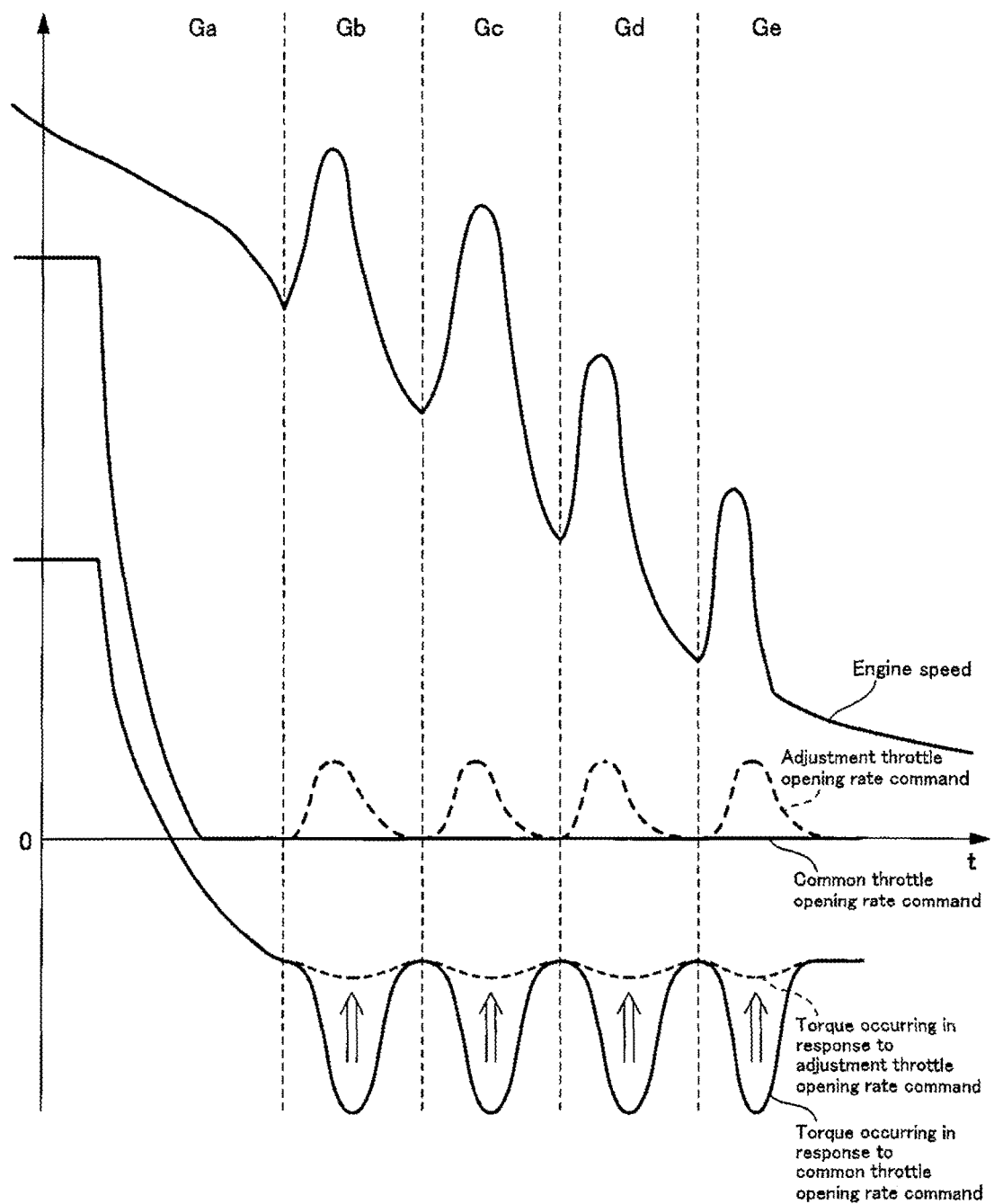
FIG. 6 is a graph showing changes in the engine speed and the torque, which result from shift down performed for deceleration of the motorcycle, along with changes over time in a common throttle opening rate command and an adjustment throttle opening rate command.

For example, in a case where the gear position is shifted to increase the reduction gear ratio by the shift down, or the like, while the vehicle is driven, and the engine ECU 17 detects an increase in the engine speed which is equal to or larger than a predetermined increase amount, the engine ECU 17 determines that the output adjustment condition is met. FIG. 6 is a graph showing changes in the engine speed and the torque, which result from the shift down performed for the deceleration of the motorcycle 1, along with changes over time in the common throttle opening rate command and the adjustment throttle opening rate command. As can be seen from the common throttle opening rate command indicated by a solid line in the graph of FIG. 6, the rider performs a throttle operation to move the throttle valve to a fully closed position, to rapidly decelerate the motorcycle 1, so that the throttle opening rate becomes close to 0. Accordingly, the output of the engine E is decreased and the engine speed is gradually decreased.

When the shift down is performed while decreasing the engine speed, the gear ratio (reduction gear ratio) of the transmission is increased, which increases the engine speed of the engine E connected to the rear wheel 3 as the drive wheel, via the transmission. In the example of FIG. 6, the gear positions are indicated by Ga to Ge, respectively. The magnitude relationship of the gear ratios of the gear positions Ga to Ge is such that (gear ratio of Ga)<(gear ratio of Gb)< . . . <(gear ratio of Ge). The increase in the engine speed, resulting from the shift down, brings about a sharp drop in the torque (an increase in deceleration torque). Specifically, as can be seen from the torque occurring in response to the common throttle opening rate command, indicated by the solid line in the graph of FIG. 6, a sharp drop in the torque occurs with an increase in the engine speed, during the shift down.

The engine ECU 17 detects the engine speed, and calculates the change amount of the engine speed, per unit time. When the engine ECU 17 detects an increase in the engine speed which is equal to or larger than the predetermined increase amount, during the shift down, the engine ECU 17 determines that the output adjustment condition is met. The predetermined increase amount refers to the increase amount of the engine speed which causes a sharp drop of the torque, and is set to a value which results in, for example, minus torque.

In this case, the engine ECU 17 performs an engine brake control in which the engine ECU 17 provides as the adjustment throttle opening rate command, a command for making the throttle opening rate of the throttle valve larger than that occurring in response to the common throttle opening rate command. As indicated by the broken line of FIG. 6, the adjustment throttle opening rate command increases the throttle opening rate with an increase in the engine during the shift down. As in the slight opening control, during the engine brake control, the engine ECU 17 maintains the throttle opening rates of the throttle valves 18A of the group A (a part of the groups) at a value occurring in response to the common throttle opening rate command, and provides as the adjustment throttle opening rate command, a command for making the throttle opening rate of the throttle valve larger than that occurring in response to the common throttle opening rate command to the throttle valves 18B of the group B (remaining group).

As described above, in the case where the engine ECU 17 detects an increase in the engine speed which is equal to or larger than the predetermined increase amount, during the shift down, the engine ECU 17 provides the adjustment throttle opening rate command to the throttle valves 18B of the group B (a part of the groups) to make the throttle opening rates of throttle valves 18B larger than those occurring in response to the common throttle opening rate command, it becomes possible to suppress the decrease in the torque due to the increase in the engine speed which is caused by the shift down, as can be seen from the torque corresponding to the throttle opening rate command, indicated by the broken line of FIG. 6. Thus, the gear position can be shifted smoothly.

Further, the engine ECU 17 which can choose one reduction gear ratio from among a plurality of reduction gear ratios may perform a blipping control for increasing the engine speed during the shift down. In the blipping control, when a gear to be connected to transmit the engine driving power to the drive wheel is shifted to a gear which results in a higher reduction gear ratio in the transmission, the engine ECU 17 increases the engine speed to lessen a gear rotational speed difference between a time period before the reduction gear ratio is changed and a time period after the reduction gear ratio is changed. In this case, after the gear position is shifted, a drop of the torque, which is similar to that as described above, may occur. For this reason, during the blipping control, the engine ECU 17 performs the engine brake control in which the engine ECU 17 provides as the adjustment throttle opening rate command, a command for making the throttle opening rate of the throttle valve larger than that occurring in response to the common throttle opening rate command.

In a case where the interiors of the combustion chambers 31 of the engine E become the transient state, by closing the throttle valves 18, the engine ECU 17 provides the adjustment throttle opening rate command to the group B to make the throttle opening rates of the throttle valves 18B larger in order to shift the combustion chambers 31 corresponding to the throttle valves 18B from the transient state. After that, at a time point when the interiors of the combustion chambers 31 corresponding to the throttle valves 18A of the group A to which the common throttle opening rate command is provided shift from the transient state to the combustion state, the engine ECU 17 may control the throttle opening rates of the throttle valves 18B by using the common throttle opening rate command.

[Traction Control]

For example, in a case where the engine ECU 17 detects or predicts a slip of the rear wheel 3 which is the drive wheel, the engine ECU 17 determines that the output adjustment condition is met. For example, the engine ECU 17 detects the vehicle speed of the front wheel 2 and the vehicle speed of the rear wheel 3 and calculates a vehicle speed difference by subtracting one of them from the other. Then, the engine ECU 17 determines whether or not the vehicle speed difference between the front wheel 2 and the rear wheel 3 is equal to or larger than a predetermined threshold of the vehicle speed difference. When the engine ECU 17 determines that the vehicle speed difference is equal to or larger than the predetermined threshold, the engine ECU 17 determines that the output adjustment condition is met. Alternatively, the engine ECU 17 may determine whether or not a vehicle speed change rate of the rear wheel 3 per unit time is equal to or larger than a predetermined threshold of the vehicle speed change rate. When the engine ECU 17 determines that the vehicle speed change rate is equal to or larger than the predetermined threshold, the engine ECU 17 may determine that the output adjustment condition is met.

In a case where the engine ECU 17 detects or predicts a slip, the engine ECU 17 performs the traction control in which the engine ECU 17 provides as the adjustment throttle opening rate command, a command for making the throttle opening rate of the throttle valve smaller than that occurring in response to the common throttle opening rate command. During the traction control, the engine ECU 17 maintains the throttle opening rates of the throttle valves 18A of the group A (a part of the groups), at a value occurring in response to the common throttle opening rate command, and provides as the adjustment throttle opening rate command, a command for making the throttle opening rate of the throttle valve smaller than that occurring in response to the common throttle opening rate command to the throttle valves 18B of the group B (remaining group).

The throttle opening rate occurring in response to the adjustment throttle opening rate command during the traction control may be such that a change over time in this throttle opening rate is set to be smaller than that occurring in response to the common throttle opening rate command, in addition to or instead of the change in the target throttle opening rate.

In this setting, by making the throttle opening rates of throttle valves 18B of the group B (a part of the groups) smaller than those occurring in response to the common throttle opening rate command, in the situation in which the drive wheel is slipping or is more likely to slip, a slip of the drive wheel can be suppressed, while preventing a rapid change in the motorcycle 1, as compared to a case where the throttle opening rates of all of the throttle valves 18A, 18B are made smaller.

Instead of using the vehicle speed difference between the front wheel 2 and the rear wheel 3, a slip may be detected or predicted in other ways known in the art. For example, a slip may be detected or predicted based on a rotational speed difference between the engine speed and the rotational speed of the rear wheel 3 which is the drive wheel.

[Launch Control]

In a case where the engine ECU 17 detects or predicts a slip during starting of the motorcycle 1, the engine ECU 17 performs a launch control in which the engine ECU 17 provides as the adjustment throttle opening rate command, a command for making the throttle opening rate of the throttle valve smaller than that occurring in response to the common throttle opening rate command. In other words, the launch control is included in the traction control. In this case, the output adjustment condition is such that the vehicle speed is lower than a predetermined threshold, in addition to the above condition in which the vehicle speed difference or the vehicle speed change rate per unit time is equal to or larger than the predetermined threshold.

In the launch control, priority is given to efficient acceleration rather than suppression of a slip. In view of this, the adjustment throttle opening rate command provided by the engine ECU 17 in the launch control is such that a rate at which the throttle opening rate occurring in response to the adjustment throttle opening rate command is made smaller than that occurring in response to the common throttle opening rate command, is set to be lower than that in the traction control. Further, a wheelie suppressing control which will be described later may be used concurrently with the launch control.

In accordance with this configuration, by providing the adjustment throttle opening rate command for making the throttle opening rate of the throttle valve smaller than that occurring in response to the common throttle opening rate command to the throttle valves 18B of the group B (a part of the groups), in the situation in which the drive wheel is slipping or is more likely to slip during starting, a slip of the drive wheel can be suppressed while preventing a rapid change in the vehicle body, and thus the motorcycle 1 can start smoothly, as compared to a case where the throttle opening rates of all of the throttle valves 18A, 18B are made smaller. Further, the engine ECU 17 can perform an automatic starting control, by performing the launch control while gradually increasing the throttle opening rate from 0.

[Wheelie Suppressing Control]

For example, in a case where the engine ECU 17 detects or predicts a wheelie state in which the front wheel 2 comes off the ground due to acceleration of the rear wheel 3 which is the drive wheel, the engine ECU 17 determines that the output adjustment condition is met. Specifically, in a case where a difference between engine torque defined by the throttle opening rates of the throttle valves 18A, 18B and the engine speed, and a wheelie limit torque defined by a bank angle of the vehicle body in the rightward and leftward direction is larger than a predetermined threshold, the engine ECU 17 determines that the output adjustment condition is met. Specifically, in this case, the output adjustment condition includes a vehicle body posture. The vehicle body of the straddle-type vehicle tends to change its posture to a large extent. Depending on the vehicle body posture, the effects of a change in the engine torque on the driving state of the straddle-type vehicle may be significant in some cases. In light of this, by adjusting the output from the engine E, depending on the vehicle body posture, the effect of the change in the engine torque on the driving state can be lessened.

In a case where the engine ECU 17 detects or predicts the wheelie state, the engine ECU 17 performs a wheelie suppressing control in which the engine ECU 17 provides as the adjustment throttle opening rate command, a command for making the throttle opening rate of the throttle valve smaller than that occurring in response to the common throttle opening rate command. During the wheelie suppressing control, the engine ECU 17 maintains the throttle opening rates of the throttle valves 18A of the group A (a part of the groups), at a value occurring in response to the common throttle opening rate command, and provides as the adjustment throttle opening rate command, a command for making the throttle opening rate of the throttle valve smaller than that occurring in response to the common throttle opening rate command to the throttle valves 18B of the group B (remaining group).

The throttle opening rate occurring in response to the adjustment throttle opening rate command during the wheelie suppressing control may be such that a change over time in this throttle opening rate is set to be smaller than that occurring in response to the common throttle opening rate command, in addition to or instead of the change in the target throttle opening rate.

In this setting, by making the throttle opening rates of throttle valves 18B of the group B (a part of the groups) smaller than those occurring in response to the common throttle opening rate command, in the situation in which the wheelie state is occurring or is more likely to occur, the wheelie state can be suppressed, while preventing a rapid change in the motorcycle, as compared to a case where the throttle opening rates of all of the throttle valves 18A, 18B are made smaller.

Figure 7:
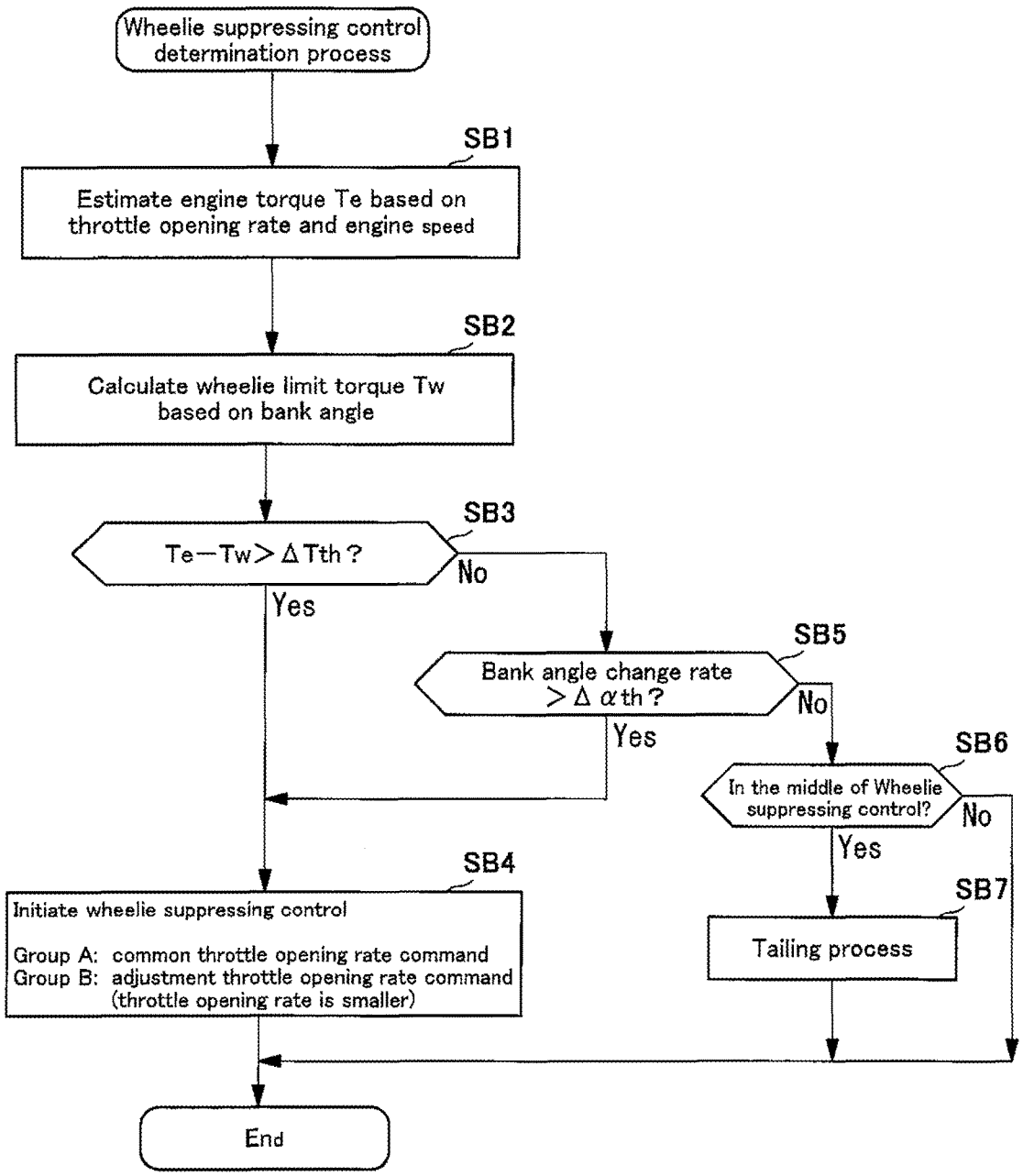
FIG. 7 is a flowchart showing the flow of a determination process in a wheelie suppressing control according to the present embodiment.

FIG. 7 is a flowchart showing the flow of a determination process in the wheelie suppressing control according to the present embodiment. Referring to FIG. 7, the engine ECU 17 detects the throttle opening rate and the engine speed, and estimates the present engine torque Te based on the detected throttle opening rate and the detected engine speed (step SB1). For example, the engine ECU 17 contains a torque conversion table indicating the engine torque Te defined to correspond to a combination of the throttle opening rate and the engine speed. The engine ECU 17 reads from the torque conversion table the engine torque Te corresponding to the detected throttle opening rate and the detected engine speed. Alternatively, the engine ECU 17 may calculate the engine torque Te based on the throttle opening rate and the engine speed which are derived by use of a specified calculation formula.

Further, the engine ECU 17 detects a bank angle α of the vehicle body and calculates a wheelie limit torque Tw corresponding to the bank angle α, based on a predetermined vehicle characteristic (step SB2). The value of the vehicle characteristic is a coefficient defined based on, for example, the center of gravity, a wheel base, and the like. The wheelie limit torque Tw is larger as the bank angle of the vehicle body (when the position of the vehicle body which is perpendicular to a horizontal plane is 0) is larger, as the center of gravity of the vehicle body is closer to its forefront, and as the wheel base is longer.

The engine ECU 17 determines whether or not the difference (Te−Tw) between the engine torque Te and the wheelie limit torque Tw is larger than a predetermined threshold ΔTth (step SB3). When the engine ECU 17 determines that the above difference (Te−Tw) is larger than the predetermined threshold ΔTth (Yes in step SB3), the engine ECU 17 determines that the wheelie state is occurring or is more likely to occur, and initiates the above wheelie suppressing control (step SB4).

On the other hand, when the engine ECU 17 determines that the above difference (Te−Tw) is equal to or smaller than the predetermined threshold ΔTth (No in step SB3), the engine ECU 17 determines whether or not a change rate Δα of the bank angle α per unit time is larger than a predetermined threshold Δαth (step SB5). When the engine ECU 17 determines that the change rate Δα is larger than the predetermined threshold Δαth (Yes in step SB5), the engine ECU 17 determines that the wheelie state is more likely to occur, and initiates the above-described wheelie suppressing control (step SB4). On the other hand, when the engine ECU 17 determines that the change rate Δα is equal to or smaller than the predetermined threshold Δαth (No in step SB5), the engine ECU 17 determines whether or not the wheelie suppressing control is being performed (step SB6). When the engine ECU 17 determines that the wheelie suppressing control is being performed (Yes in step SB6), the engine ECU 17 performs a tailing process, and shifts from the wheelie suppressing control to the common control in which the engine ECU 17 provides the common throttle opening rate command to both of the driving mechanisms 19A, 19B (step SB7).

[Slide Suppressing Control]

For example, in a case where the engine ECU 17 predicts the slide state of the vehicle body, the engine ECU 17 determines that the output adjustment condition is met. Specifically, when the engine ECU 17 determines that the throttle opening rate (throttle angle) θ is smaller than a predetermined threshold θth2 of the throttle opening rate, and the bank angle α of the vehicle body in the rightward and leftward direction is larger than a predetermined threshold αth of the bank angle, the engine ECU 17 determines that the output adjustment condition is met. In this case, the output adjustment condition includes the vehicle body posture.

In a case where the engine ECU 17 predicts the slide state of the vehicle body, the engine ECU 17 performs a slide suppressing control in which the engine ECU 17 provides as the adjustment throttle opening rate command, a command for suppressing an increase in the throttle opening rate. During the slide suppressing control, the engine ECU 17 maintains the throttle opening rates of the throttle valves 18A of the group A (a part of the groups) at a value occurring in response to the common throttle opening rate command, and provides as the adjustment throttle opening rate command, a command for suppressing an increase in the throttle opening rate to the throttle valves 18B of the group B (remaining group).

In the straddle-type vehicle, the vehicle body is banked to the right or to the left during cornering. In the case of cornering in a state in which the vehicle speed is reduced, the throttle opening rate becomes substantially 0. If the throttle opening rate is increased to re-accelerate the motorcycle 1 in a state in which the vehicle body is banked during the cornering, the rear wheel 3 which is the drive wheel is likely to slip and slide. To suppress the vehicle body from sliding, in a case where the throttle opening rate is small in the state in which the vehicle body is banked, the engine ECU 17 initiates the slide suppressing control. In the slide suppressing control, the engine ECU 17 provides the adjustment throttle opening rate command to the throttle valves 18B to suppress an increase in the throttle opening rates of the throttle valves 18B. The throttle valves 18B are permitted to make their throttle opening rates small.

In accordance with this configuration, by suppressing an increase in the throttle opening rates of the throttle valves 18B of the group B (a part of the groups), in the situation in which the vehicle body is likely to slide, it becomes possible to suppress the vehicle body from sliding, while preventing a rapid change in the vehicle body as compared to a case where the throttle opening rates of all of the throttle valves 18A, 18B are made smaller.

Figure 8:
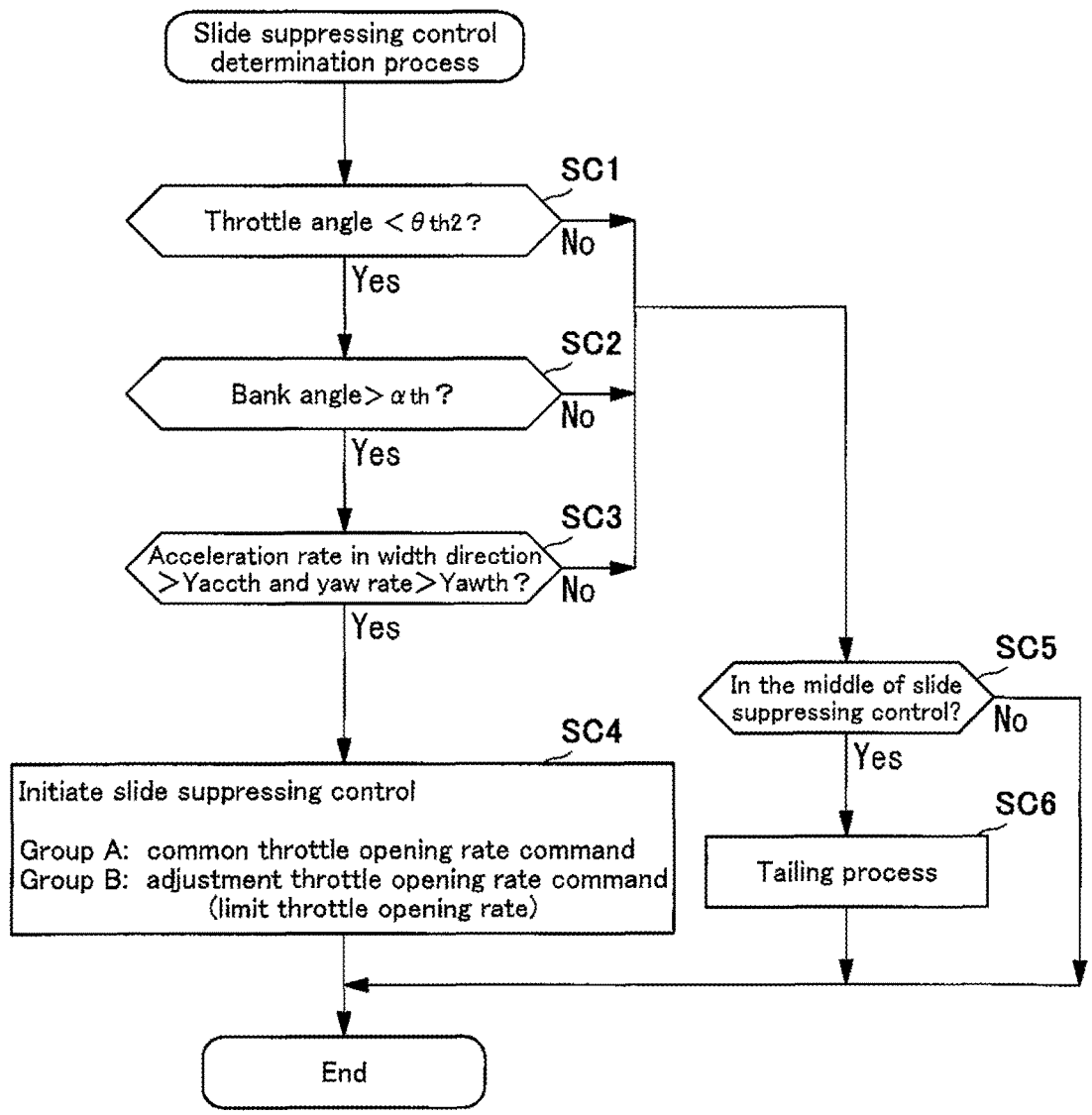
FIG. 8 is a flowchart showing the flow of a determination process in a slide suppressing control according to the present embodiment.

FIG. 8 is a flowchart showing the flow of a determination process in the slide suppressing control according to the present embodiment. Referring to FIG. 8, the engine ECU 17 detects the throttle opening rate, and determines whether or not the detected throttle opening rate is smaller than a predetermined threshold θth2 of the throttle opening rate (step SC1). The throttle opening rate used for the determination may be the rotational angle (actual throttle opening rate) of the throttle valve 18A, 18B detected by the throttle opening rate sensor 25A, 25B, or the rotation amount (throttle operation amount) of the throttle grip 7 which is detected by the throttle operation amount sensor 41.

When the engine ECU 17 determines that the throttle opening rate is smaller than the predetermined threshold θth2 (Yes in step SC1), the engine ECU 17 detects the bank angle α and determines whether or not the detected bank angle α is larger than a predetermined threshold angle αth of the bank angle (step SC2).

When the engine ECU 17 determines that the bank angle α is larger than the predetermined threshold angle αth (Yes in step SC2), the engine ECU 17 detects an acceleration rate in the width (Y-axis) direction, and the yaw rate (rotational speed around Z-axis), and determines whether or not the acceleration rate in the width direction is larger than a predetermined threshold Yaccth of the acceleration rate in the width direction, and the yaw rate is larger than a predetermined threshold Yawth of the yaw rate (step SC3).

When the engine ECU 17 determines that the acceleration rate in the width direction is larger than the predetermined threshold Yaccth and the yaw rate is larger than the predetermined threshold Yawth (Yes in step SC3), to be precise, the throttle opening rate is smaller than the predetermined threshold θth2, the bank angle α is larger than the predetermined threshold αth, the acceleration rate in the width direction is larger than the predetermined threshold Yaccth, and the yaw rate is larger than the predetermined threshold Yawth, the engine ECU 17 determines that the vehicle body is likely to slide, and initiates the above-described slide suppressing control (step SC4). When even one of the conditions of the throttle opening rate, the bank angle, the acceleration rate, and the yaw rate is not met (No in step SC1, SC2 or SC3), the engine ECU 17 determines whether or not the slide suppressing control is being performed (step SC5). When the engine ECU 17 determines that the slide suppressing control is being performed (Yes in step SC5), the engine ECU 17 performs the tailing process, and shifts from the slide suppressing control to the common control in which the engine ECU 17 provides the common throttle opening rate command to both of the driving mechanisms 19A, 19B (step SC6).

Although in the above-described example, the engine ECU 17 determines whether or not to shift to the slide suppressing control based on the throttle opening rate, the bank angle, the acceleration rate in the width direction, and the yaw rate, a condition in which the vehicle speed is higher than a predetermined threshold of the vehicle speed may be added. In this case, the engine ECU 17 can give priority to acceleration rather than the slide suppressing control, for example, in a case where the vehicle speed is extremely low. Further, the determination step based on one or both of the acceleration rate in the width direction and the yaw rate may be omitted from the flow of the above-described slide suppressing control determination process. In other words, the engine ECU 17 may determine whether or not the output adjustment condition is met based on the two parameters which are the throttle opening rate and the bank angle.

Although in the above-described slide suppressing control, the command for suppressing an increase in the throttle opening rate is used as the adjustment throttle opening rate command, a command for fixing the throttle opening rate to 0 may be used as the adjustment throttle opening rate command.

Embodiment 2

Figure 9:
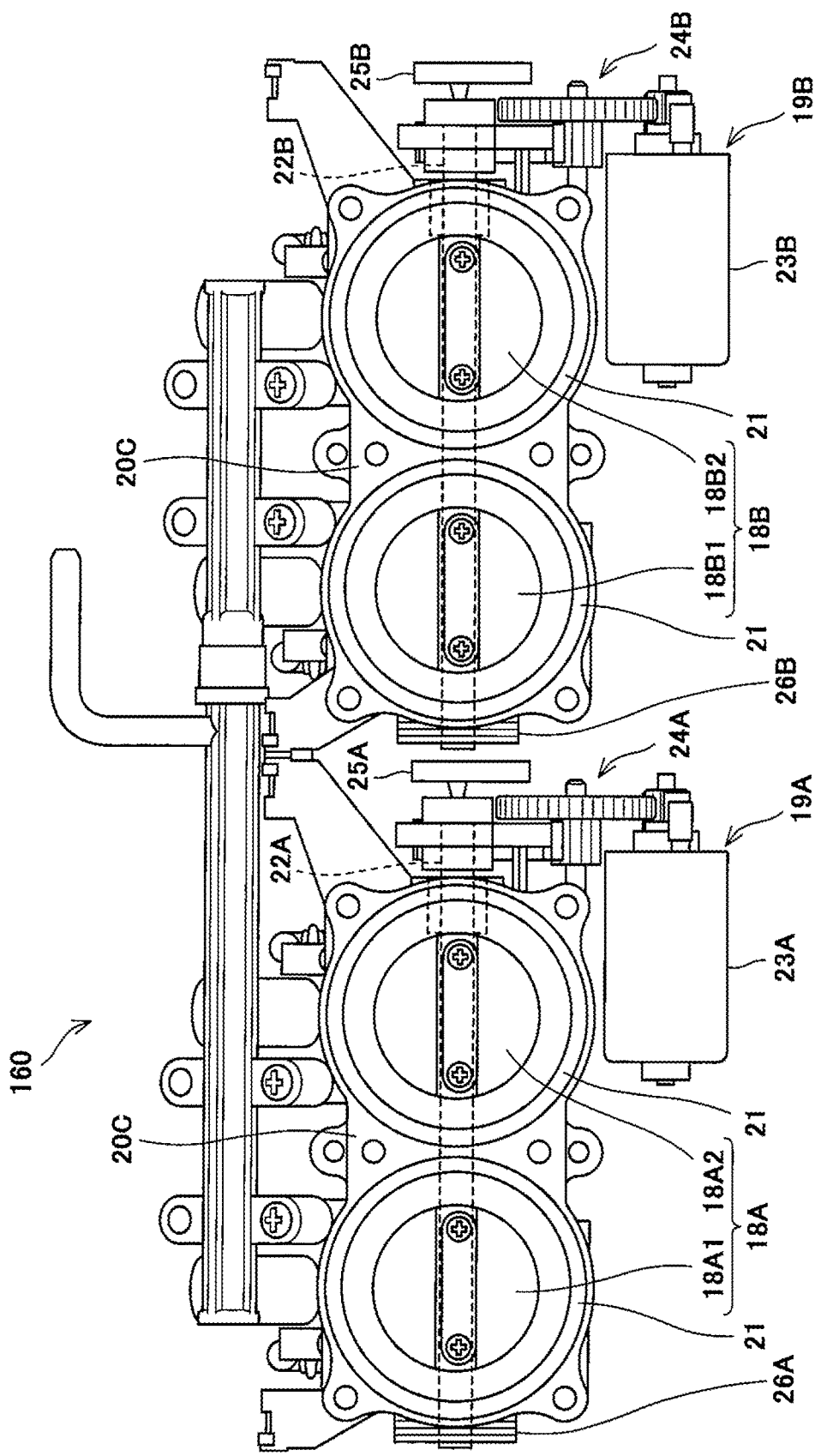
FIG. 9 is a plan view showing the external appearance of a throttle device of a motorcycle according to Embodiment 2 of the present embodiment.

FIG. 9 is a plan view showing the external appearance of a throttle device 160 of the motorcycle 1 according to Embodiment 2 of the present embodiment. In Embodiment 2, the same components as those of Embodiment 1 are designated by the same reference symbols and will not be described repeatedly. The throttle device 160 of the present embodiment is different from the throttle device 16 of Embodiment 1 in that two throttle bodies 20C have the same shape. Referring to FIG. 9, the two throttle bodies 20C are each provided with the biasing mechanisms 26A, 26B, respectively, at one end thereof in the direction in which the combustion chambers 31 aligned, in a state in which the throttle bodies 20C are mounted to the engine E, and provided with the driving mechanisms 19A, 19B, respectively, at the other ends thereof in the direction in which the combustion chambers 31 are aligned. Since the throttle device 160 is configured in such a manner that the two or more throttle bodies 20C of the same shape are aligned, manufacturing cost of the throttle device 160 can be reduced. In addition, if the number of the throttle bodies 20C aligned is changed, the configuration of the throttle device 160 can be easily changed to be easily applicable to various types of engines such as a two-cylinder engine, a four-cylinder engine, or a sixth-cylinder engine.

In the present embodiment, in a case where a cam chain is placed at one end portion of the throttle device 160 in the direction in which the combustion chambers 31 are aligned (outside of the throttle body 20C of the group B), the driving mechanism 19A including the motor 23A is not placed at the other end portion of the throttle device 160, in the direction in which the combustion chambers 31 are aligned (outside of the throttle body 20C of the group A). In this layout, a space formed at the other end portion of the throttle device 160 can be used as a space in which other components are placed.

Embodiment 3

Figure 10:
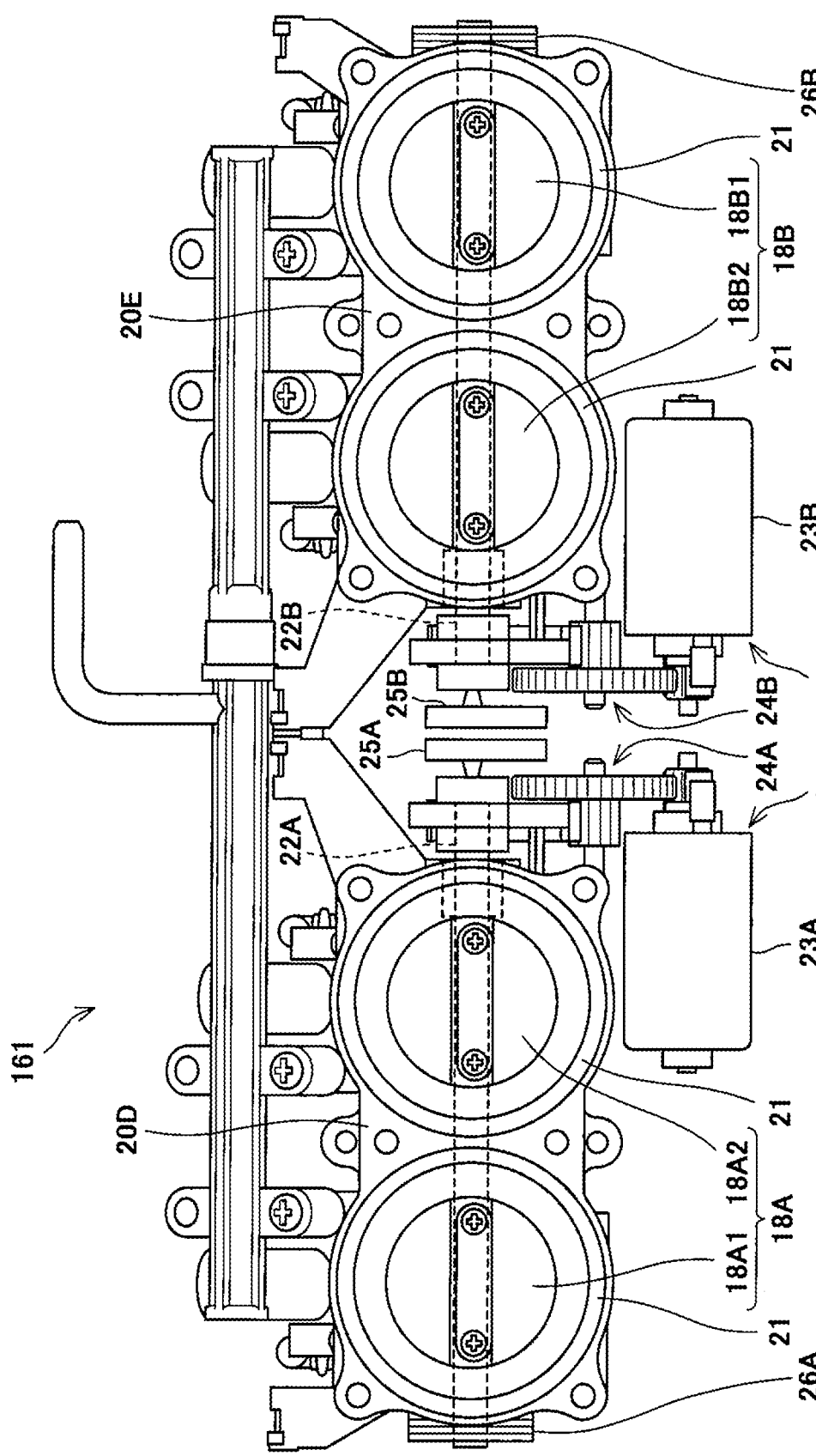
FIG. 10 is a plan view showing the external appearance of a throttle device of a motorcycle according to Embodiment 3 of the present embodiment.

FIG. 10 is a plan view showing the external appearance of a throttle device 161 of the motorcycle 1 according to Embodiment 3 of the present embodiment. In Embodiment 3, the same components as those of Embodiment 1 are designated by the same reference symbols and will not be described repeatedly. The throttle device 161 of the present embodiment is different from the throttle device 16 of Embodiment 1 in that two throttle bodies 20D, 20E are placed in such a manner that the driving mechanisms 19A, 19B are placed between the throttle bodies 20D, 20E in the direction in which the throttle valves 18A, 18B are aligned. The throttle body 20D is configured in such a manner that the throttle body 20A of FIG. 3 is inverted in the rightward and leftward direction, when viewed from above. The throttle body 20E is configured in such a manner that the throttle body 20B of FIG. 3 is inverted in the rightward and leftward direction, when viewed from above. The driving mechanisms 19A, 19B are placed at the center portion of the throttle device 161 in the direction in which the throttle valves 18A, 18B are aligned. In this layout, the motors 23A, 23B are placed to face each other and the sensors 25A, 25B are placed to face each other at the center portion of the throttle device 161 in the direction in which the throttle valves 18A, 18B are aligned.

In the layout in which the driving mechanisms 19A, 19B are placed between the throttle bodies 20D, 20E in the direction in which the throttle valves 18A, 18B are aligned, the motors 23A, 23B are placed close to each other, and the sensors 25A, 25B are placed close to each other. In this configuration, wires via which the motors 23A, 23B are connected to the engine ECU 17 can be easily laid out in the same manner, and wires via which the sensors 25A, 25B are connected to the engine ECU 17 can be easily laid out in the same manner.

Modified Examples

Although the embodiments of the present invention have been described so far, the present invention is not limited to the above-described embodiments, and can be improved, altered, or modified in various ways within the spirit of the invention.

For example, in the above-described embodiments, the engine ECU 17 which functions as the throttle control device determines whether or not the output adjustment condition is met, and provides different throttle opening rate commands to the two driving mechanisms 19A, 19B, which independently drive the throttle valves 18A of the group A and the throttle valves 18B of the group B, respectively. However, this is merely exemplary. For example, in a case where the output adjustment condition is met, the rider may manually operate a switch or the like to input the adjustment throttle opening rate command so that the throttle opening rates of the throttle valves 18B of the group B (a part of the groups) become ones which depend on the rider's throttle operation less than those occurring in response to the common throttle opening rate command do.

Although in the above-described embodiments, the output adjustment condition is set based on the vehicle body posture, by use of the roll angle (in the slide suppressing control) and the pitch angle (in the wheelie suppressing control), the output adjustment condition may be set by use of the yaw angle.

Although in the above-described embodiment, the inline four-cylinder engine has been exemplarily described, it is sufficient that the engine E includes a plurality of cylinders. The engine E may include an even number of cylinders or an odd number of cylinders. Further, the number of the throttle valves to be driven by the driving mechanism of one of the groups may be different from the number of the throttle valves to be driven by the driving mechanism of another group. For example, in the inline four-cylinder engine, each group may include two cylinders as in the above-described embodiments, or one of the groups may include one cylinder and another group may include three cylinders. The number of the combustion chambers (the number of cylinders) provided with the throttle valves to which the adjustment throttle opening rate command is provided is not particularly limited. However, to mitigate an impact exerted on the vehicle body and finely adjust the engine output, the number of the combustion chambers provided with the throttle valves to which the adjustment throttle opening rate command is provided is desirably set to be equal to or less than the number of the combustion chambers (the number of cylinders) provided with the throttle valves to which only the common throttle opening rate command is provided. The grouping may be such that adjacent cylinders belong to the same group as in the above-described embodiments, or the cylinders which are not adjacent to each other may belong to the same group. In the latter case, for example, the throttle valves 18A1, 18B1 may belong to a first group, and the throttle valves 18A2, 18B2 may belong to a second group.

Further, the grouping may be conducted in a different manner depending on the content of the output adjustment condition. For example, the engine ECU 17 provides the adjustment throttle opening rate command to the throttle valves 18B1, 18B2 in the group-based control (e.g., traction control) in a case where a certain output adjustment condition is met (the grouping in the above-described embodiments is used), while the adjustment throttle opening rate command may be provided only to the throttle valve 18B2 in the group-based control (e.g., launch control) in a case where another output adjustment condition is met (the grouping is such that the throttle valves 18A1, 18A2, 18B1 belong to a first group, and the throttle valve 18B2 belongs to a second group).

Although in the above-described embodiments, the plurality of throttle valves are divided into the two groups, they may be divided into three or more groups. For example, among sixth cylinders of a sixth-cylinder engine, three cylinders may belong to a first group, two cylinders other than the three cylinders may belong to a second group, and the remaining one cylinder may belong to a third group. In this setting, the throttle valves may be controlled for each of the groups. In this case, the group to which the engine ECU 17 provides the adjustment throttle opening rate command may be shifted stepwisely based on the vehicle state. For example, when a first condition is met, the engine ECU 17 may provide the adjustment throttle opening rate command to the third group. Thereafter, when a second condition is met, the engine ECU 17 may provide the adjustment throttle opening rate command to the second and third groups.

Figure 11A:
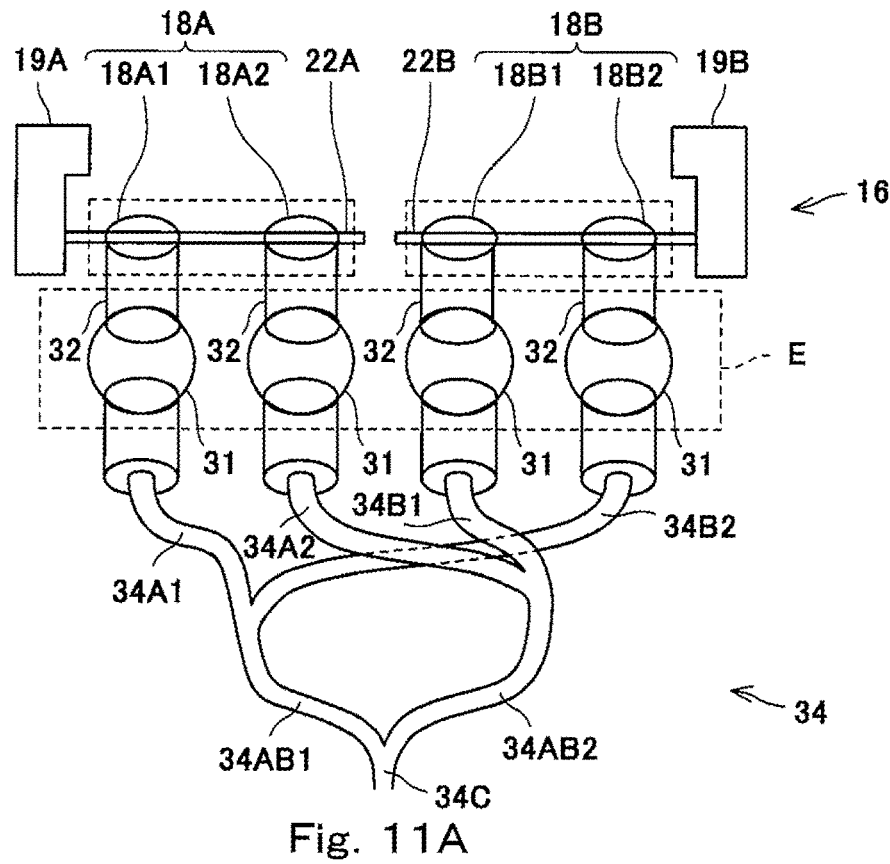
FIG. 11A is a schematic view showing an example of the layout (connection configuration) of exhaust pipes.
Figure 11B:
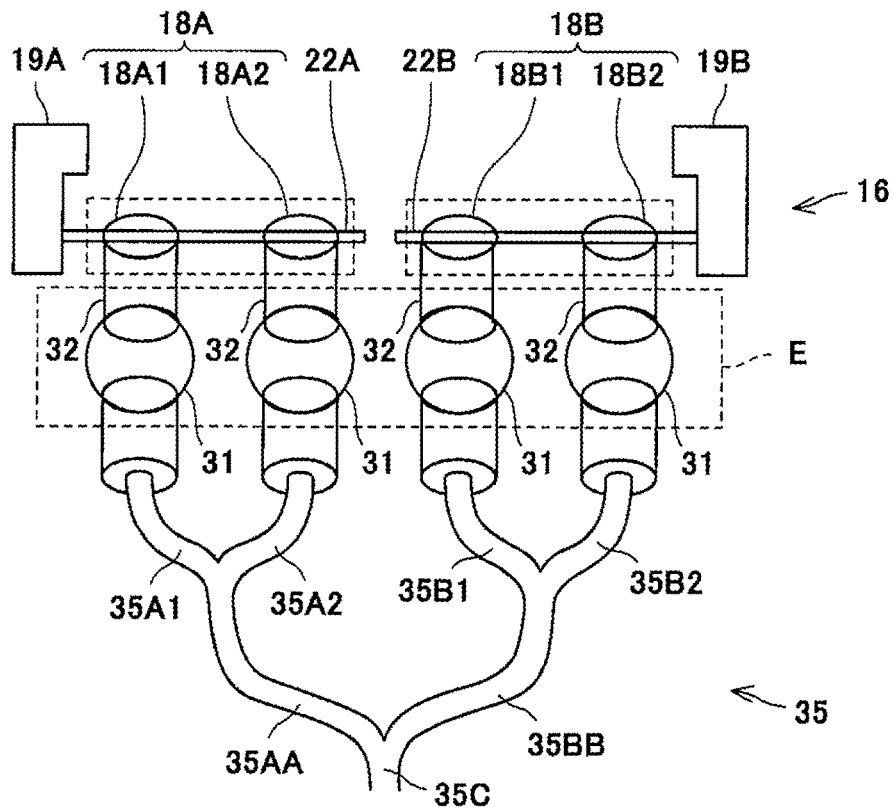
FIG. 11B is a schematic view showing another example of the layout (connection configuration) of the exhaust pipes.

Further, the layout (connection or collecting) configuration of the exhaust pipes may be determined based on the grouping of the throttle valves 18A, 18B. FIGS. 11A and 11B are schematic views each exemplarily showing the layout (connection configuration) of the exhaust pipes. For example, as shown in FIG. 11A, an exhaust pipe 34A1 connected to the exhaust port of the combustion chamber 31 (combustion chamber 31 at a left end of FIG. 11A) provided with the throttle valve 18A1 of the throttle valves 18A driven by the driving mechanism 19A, and an exhaust pipe 34B2 connected to the exhaust port of the combustion chamber 31 (combustion chamber 31 at a right end of FIG. 11A) provided with the throttle valve 18B2 of the throttle valves 18B driven by the driving mechanism 19B may be merged into an exhaust pipe 34AB1, an exhaust pipe 34A2 connected to the exhaust port of the combustion chamber 31 (combustion chamber 31 next to the leftmost combustion chamber 31 of FIG. 11A) provided with the throttle valve 18A2 of the throttle valves 18A driven by the driving mechanism 19A, and an exhaust pipe 34B1 connected to the exhaust port of the combustion chamber 31 (combustion chamber 31 next to the rightmost combustion chamber 31 of FIG. 11A) provided with the throttle valve 18B1 of the throttle valves 18B driven by the driving mechanism 19B may be merged into an exhaust pipe 34AB2, and the exhaust pipe 34AB1 and the exhaust pipe 34AB2 may be merged into an exhaust pipe 34C. In brief, the exhaust pipe 34 is configured in such a manner that the four exhaust pipes 34A1, 34A2, 34B1, 34B2 are merged into the two exhaust pipes 34AB1, 34AB2, and then the two exhaust pipes 34AB1, 34AB2 are merged into the single exhaust pipe 34C. In this configuration, even in a case where the engine ECU 17 provides the adjustment throttle opening rate command to the throttle valves 18B to make their throttle opening rates different from each other among the cylinders, and the exhaust gas temperatures are different among the cylinders, the exhaust gas temperatures are averaged in the exhaust pipes 34AB1, 34AB2 into which the four exhaust pipes 34A1, 34A2, 34B1, 34B2 are merged. As a result, non-uniformity of the temperature in the whole of the exhaust pipe 34 can be lessened.

Alternatively, for example, as shown in FIG. 11B, exhaust pipes 35A1, 35A2 connected to the exhaust ports of the combustion chambers 31 (two combustion chambers 31 at a left side of FIG. 11B) provided with the throttle valves 18A driven by the driving mechanism 19A may be merged into an exhaust pipe 35AA, exhaust pipes 35B1, 35B2 connected to the exhaust ports of the combustion chambers 31 (two combustion chambers 31 at a right side of FIG. 11B) provided with the throttle valves 18B driven by the driving mechanism 19B may be merged into an exhaust pipe 35BB, and the exhaust pipe 35AA and the exhaust pipe 35BB may be merged into an exhaust pipe 35C. In brief, the exhaust pipe 35 is configured in such a manner that the four exhaust pipes 35A1, 35A2, 35B1, 35B2 are merged into the two exhaust pipes 35AA, 35BB, and the two exhaust pipes 35AA, 35BB are merged into the single exhaust pipe 35C.

In this case, the amounts of a catalyst (not shown) carried in the exhaust pipes may be made different between the exhaust pipes 35A1, 35A2 corresponding to the throttle valves 18A to which only the common throttle opening rate command is provided, and the exhaust pipes 35B1, 35B2 corresponding to the throttle valves 18B to which the either the common throttle opening rate command or the adjustment throttle opening rate command is provided. The temperature increases of the exhaust pipes 35B1, 35B2 connected to the combustion chambers 31 provided with the throttle valves 18B to which the either the common throttle opening rate command or the adjustment throttle opening rate command is provided, and the exhaust pipe 35BB, are greater than those of the exhaust pipes 35A1, 35A2 connected to the combustion chambers 31 provided with the throttle valves 18A to which only the common throttle opening rate command is provided, and the exhaust pipe 35AA. In view of this, exhaust gas temperature sensors may be placed in specified locations of the exhaust pipes 35B1, 35B2, 35BB, respectively, whose temperature increases are greater than those of the exhaust pipes 35A1, 35A2, 35AA, to monitor the exhaust gas temperatures, or to suppress an increase in the temperatures in some way or other. To suppress an increase in the temperatures, a structure for this purpose may be added to at least a portion of the exhaust pipes 35B1, 35B2, 35BB, the exhaust pipes 35B1, 35B2, 35BB may be placed in locations where blowing wind contact these exhaust pipes, or the exhaust pipes 35B1, 35B2, 35BB may be placed in the vicinity of a radiator fan (not shown). Note that vehicle components which are low in heat resistance may be placed in locations close to the exhaust pipes 35A1, 35A2, 35AA, whose temperature increases are less than those of the exhaust pipes 35B1, 35B2, 35BB.

In a case where the exhaust pipes 35 are placed below the engine E and on one side in the vehicle width direction with respect to a center in the vehicle width direction, the exhaust pipes 35B1, 35B2, 35BB, whose temperature increases are more than those of the exhaust pipes 35A1, 35A2, 35AA, may be placed on one side in the vehicle width direction. In this layout, the exhaust pipes 35A1, 35A2, 35AA, whose temperature increases are less than those of the exhaust pipes 35B1, 35B2, 35BB, can be placed outward in the vehicle width direction. Therefore, the heat radiation characteristic of the exhaust pipes 35B1, 35B2, 35BB can be enhanced. To the contrary, the exhaust pipes 35A1, 35A2, 35AA, whose temperature increases are less than those of the exhaust pipes 35B1, 35B2, 35BB, may be placed on one side in the vehicle width direction with respect to the center. In this layout, the exhaust pipes 35B1, 35B2, 35BB, whose temperature increases are more than those of the exhaust pipes 35A1, 35A2, 35AA, are placed inward in the vehicle width direction. Therefore, an increase in the temperature in outer side portions of the vehicle body in the vehicle width direction can be prevented.

Although in the above-described embodiments, the sensor 25A is placed close to the motor 23A and the link mechanism 24A of each of the throttle bodies 20A, 20C, 20D, and the sensor 25B is placed close to the motor 23B and the link mechanism 24B of each of the throttle bodies 20B, 20C, 20E, the sensor 25A may be placed away from the motor 23A and the link mechanism 24A, and the sensor 25B may be placed away from the motor 23B and the link mechanism 24B. Further, the sensor 25A may be placed close to the biasing mechanism 26A of the throttle bodies 20A, 20C, 20D, and the sensor 25B may be placed close to the biasing mechanism 26B of the throttle bodies 20B, 20C, 20E.

Although in the above-described embodiments, the motor capabilities of the two or more driving mechanisms are equal to each other and the reduction gear ratios of the link mechanisms are equal to each other, at least one of the motor capability and the reduction gear ratio of the link mechanism may be made different between the two or more driving mechanisms. The sizes and/or shapes of the throttle valves 18A, 18B may be made different between the groups.

The configurations of the above-described embodiments and modified examples may be applied to a V-type engine, a horizontally-opposed cylinder engine, etc., as well as the in-line cylinder engine. For example, in the V-type engine, a cylinder (one bank) in one of two rows may correspond to a first group, while a cylinder in the other row may correspond to a second group. In a case where one of the two rows is comprised of a plurality of cylinders, for example, in a V-type four-cylinder engine, a cylinder in one of the two rows and a cylinder in the other row may correspond to the same group, or a cylinder in one of the two rows and another cylinder in the same row may correspond to different groups, respectively.

Although in the above-described embodiments, the throttle bodies 20A, 20B are divided into the groups, a throttle body may be unitarily formed to include the throttle valves 18A, 18B belonging to the two or more groups, or the throttle bodies 20A, 20B may be divided into the groups in such a manner that the throttle bodies 20A, 20B do not correspond to the groups to which the throttle valves 18A, 18B belong. Further, the layout of the driving mechanisms 19A, 19B, and the like is not particularly limited.

Although in the above-described embodiments, several examples of the plurality of different output adjustment conditions, and the plurality of group-based controls (slight opening control, and the like) performed when the output adjustment conditions are met have been described specifically, all of these group-based controls need not be performed, and conditions and controls which are different from those described above may be used. For example, priority may be given to the plurality of group-based controls to be performed. In this case, if the output adjustment conditions of the plurality of controls overlap with each other, the priorities of the controls may be compared to each other, and the control with a higher priority may be performed. If the overlapping controls do not conflict with each other, they may be performed concurrently.

The method of the group-based control is not limited to the above-described method. For example, a change in the amount of the intake air supplied to the combustion chamber 31 of the engine E is affected by inertia. For this reason, a change in the engine output may be delayed even when the throttle opening rate is the same. In this case, the engine ECU 17 can accelerate the change in the amount of the intake air in the throttle valves 18B to which the engine ECU 17 provides the adjustment throttle opening rate command. This makes it possible to suppress the delay in the change in the engine output which is caused by the inertia. In a case where the engine output is affected by the inertia, the engine ECU 17 may provide the adjustment throttle opening rate command to the driving mechanism 19B for driving the throttle valves 18B irrespective of the states of the interiors of the combustion chambers 31 of the engine E. Specifically, in a state in which the interiors of the combustion chambers 31 are in the combustion state (e.g., as described above, the drive wheel is slipping or is more likely to slip), the group-based control may be performed to finely adjust the engine output.

Further, the engine ECU 17 may perform the group-based control even in a state in which the interiors of the combustion chambers 31 of the engine E are in the combustion state. For example, in a case where a change over time in the throttle opening rate is larger than a predetermined value, the engine ECU 17 may provide the adjustment throttle opening rate command for increasing the speed at which the throttle valves 18B are opened and closed to the driving mechanism 19B for driving the throttle valves 18B.

In a case where the interiors of the combustion chambers 31 shift from the combustion state to the transient state or the non-combustion state, in response to the operation for closing the throttle valves 18, the engine ECU 17 may perform the group-based control. In this case, the engine ECU 17 provides as the adjustment throttle opening rate command, a command for retarding a change over time in the throttle opening rate, namely, a time when the throttle valves 18B reach fully closed positions, or maintaining or increasing the throttle opening rates to the driving mechanism 19B for driving the throttle valves 18B. This makes it possible to maintain the combustion states of the interiors of the combustion chambers 31 provided with the throttle valves 18B. In this way, it becomes possible to prevent a situation in which the interiors of all of the combustion chambers 31 become the transient state or the non-combustion state.

In a case where the motorcycle 1 is rapidly accelerated after rapid deceleration has occurred, namely, after the engine brake control was performed, for example, in a case where cornering is finished, the engine ECU 17 may perform the group-based control to easily accelerate the motorcycle 1 in such a manner that the engine ECU 17 provides as the adjustment throttle opening rate command, a command for maintaining the combustion states of the interiors of the combustion chambers 31 provided with the throttle valves 18B, namely, for preventing the throttle opening rates of the throttle valves 18B from becoming zero, to the driving mechanism 19B for driving the throttle valves 18B, even when the operation for fully closing the throttle valves 18B is performed by the rider.

The present invention is suitably applied to vehicles in which a change in an increase rate (acceleration rate) of the vehicle speed with respect to the rider's throttle operation is large. Specifically, the present invention is suitably applied to vehicles which are relatively light in weight, namely, an output weight ratio is high, such as a straddle-type vehicle including personal watercraft (PWC). Particularly, the present invention is suitably applied to vehicles in which the rider's driving feel is significantly affected by a change in the engine output in a case where the interiors of the combustion chambers 31 shift to the transient state, or to vehicles in which rider's driving feel may be affected by a small change in the engine output. In particular, the present invention is suitably applied to a motorcycle which is higher in output weight ratio than an automobile is.

The present invention is useful in obtaining a change in the output which is proportional to the rider's throttle operation, as well as finely adjusting the engine output.

The vehicle, the straddle-type vehicle, and the method of driving the throttle valves of the present invention are useful in finely adjusting the engine output according to the situation.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

The invention claimed is:

1. A straddle vehicle comprising:
an engine including a plurality of combustion chambers;
a plurality of throttle valves provided at the plurality of combustion chambers to correspond to the plurality of combustion chambers, respectively, to independently adjust flow rates of intake air flowing into the plurality of combustion chambers, respectively;
two or more driving mechanisms for electrically driving the plurality of throttle valves divided into two or more groups in such a manner that each of the two or more driving mechanisms drives the throttle valve in a corresponding group of the two or more groups; and
an engine control unit for controlling the two or more driving mechanisms based on an amount of throttle operation information input by a rider and a predetermined vehicle state,
wherein when a predetermined output adjustment condition is not met, the engine control unit provides a common throttle opening rate command to the driving mechanisms, in response to the throttle operation information input by the rider,
wherein when the predetermined output adjustment condition is met, the engine control unit provides the common throttle opening rate command to at least one of the two or more driving mechanisms, and an adjustment throttle opening rate command, different from the common throttle opening rate command, to another driving mechanism of the two or more driving mechanisms,
wherein a change over time in a throttle opening rate occurring in response to the adjustment throttle opening rate command is set to be larger than a change over time in the throttle opening rate occurring in response to the common throttle opening rate command, and
wherein the predetermined output adjustment condition includes a condition in which the common throttle opening rate command is a command for increasing an output of the engine.

2. The straddle vehicle according to claim 1,
wherein when the engine control unit determines that a requested output increase rate is higher than an output increase rate occurring in response to the common throttle opening rate command, the engine control unit determines that the predetermined output adjustment condition is met.

3. The straddle vehicle according to claim 1,
wherein when the throttle operation information input by the rider includes a command for increasing an output in a state in which an engine speed is higher than a predetermined engine speed, and interiors of the combustion chambers are in a non-combustion state, the engine control unit determines that the predetermined output adjustment condition is met, and provides as the adjustment throttle opening rate command, a command for making a throttle opening rate larger than a throttle opening rate occurring in response to the common throttle opening rate command to the another driving mechanism.

4. The straddle vehicle according to claim 1, comprising:
a drive wheel driven in response to an output of the engine,
wherein when the engine control unit detects or predicts a slip of the drive wheel, the engine control unit determines that the predetermined output adjustment condition is met, and provides as the adjustment throttle opening rate command, a command for making a throttle opening rate smaller than a throttle opening rate occurring in response to the common throttle opening rate command to the another driving mechanism.

5. The straddle vehicle according to claim 1,
wherein the adjustment throttle opening rate command is set to depend on the throttle operation information input by the rider to a degree less than a degree to which the common throttle opening rate command depends on the throttle operation information.

6. The straddle vehicle according to claim 2,
wherein the engine control unit determines whether or not the requested output increase rate is higher than the output increase rate occurring in response to the common throttle opening rate command, based on at least one of the engine speed, a vehicle speed, slip information based on a vehicle speed difference between front and rear wheels, a brake pressure, and bank information of the vehicle body.

7. The straddle vehicle according to claim 3,
wherein the non-combustion state is a state in which a part of fuel injected to the interior of the combustion chamber is not combusted.

8. The straddle vehicle according to claim 3,
wherein the engine control unit determines that the interior of the combustion chamber is in the non-combustion state when the throttle opening rate meets a predetermined condition in which the throttle opening rate is small.

9. The straddle vehicle according to claim 1,
wherein the engine control unit obtains the throttle opening rate, a vehicle speed, and an engine speed, and
wherein the predetermined output adjustment condition is a condition in which the throttle opening rate is smaller than a first threshold, the vehicle speed is lower than a second threshold, the engine speed is higher than a third threshold, and the throttle operation information is a command for increasing the output of the engine.

10. A straddle vehicle comprising:
an engine including a plurality of combustion chambers;
a plurality of throttle valves provided at the plurality of combustion chambers to correspond to the plurality of combustion chambers, respectively, to independently adjust flow rates of intake air flowing into the plurality of combustion chambers, respectively;
two or more driving mechanisms for electrically driving the plurality of throttle valves divided into two or more groups in such a manner that each of the two or more driving mechanisms drives a throttle valve in a corresponding group of the two or more groups; and
an engine control unit for controlling the two or more driving mechanisms based on an amount of throttle operation information input by a rider and a predetermined vehicle state,
wherein when a predetermined output adjustment condition is not met, the engine control unit provides a common throttle opening rate command to the driving mechanisms, in response to the throttle operation information input by the rider,
wherein when the predetermined output adjustment condition is met, the engine control unit provides the common throttle opening rate command to at least one of the two or more driving mechanisms, and an adjustment throttle opening rate command, different from the common throttle opening rate command, to another driving mechanism of the two or more driving mechanisms, and
wherein the predetermined output adjustment condition is met when the engine control unit detects that an engine speed is increased with respect to a command value due to an external driving force for causing a drive wheel to rotate being transmitted from the drive wheel to the engine.

11. The straddle vehicle according to claim 10,
wherein when the engine control unit detects a torque decrease with a predetermined decrease amount or more in a state in which the engine speed is decreased, the engine control unit determines that the predetermined output adjustment condition is met, and provide as the adjustment throttle opening rate command, a command for making a throttle opening rate larger than a throttle opening rate occurring in response to the common throttle opening rate command.

12. A straddle vehicle comprising:
an engine including a plurality of combustion chambers;
a plurality of throttle valves provided at the plurality of combustion chambers to correspond to the plurality of combustion chambers, respectively, to independently adjust flow rates of intake air flowing into the plurality of combustion chambers, respectively;
two or more driving mechanisms for electrically driving the plurality of throttle valves divided into two or more groups in such a manner that each of the two or more driving mechanisms drives a throttle valve in a corresponding group of the two or more groups; and
an engine control unit for controlling the two or more driving mechanisms based on an amount of throttle operation information input by a rider and a predetermined vehicle state,
wherein when a predetermined output adjustment condition is not met, the engine control unit provides a common throttle opening rate command to the driving mechanisms, in response to the throttle operation information input by the rider,
wherein when the predetermined output adjustment condition is met, the engine control unit provides the common throttle opening rate command to at least one of the two or more driving mechanisms, and an adjustment throttle opening rate command, different from the common throttle opening rate command, to another driving mechanism of the two or more driving mechanisms, and
wherein when the throttle operation information input by the rider includes a command for increasing an output in a state in which an engine speed is higher than a predetermined engine speed and interiors of the combustion chambers are in a non-combustion state, the engine control unit determines that the predetermined output adjustment condition is met, and provides as the adjustment throttle opening rate command a command for making a throttle opening rate larger than a throttle opening rate occurring in response to the common throttle opening rate command to the another driving mechanism.

* * * * *